United States Patent
Bang et al.

(10) Patent No.: US 12,284,407 B2
(45) Date of Patent: Apr. 22, 2025

(54) ELECTRONIC DEVICE FOR TRANSMITTING AND RECEIVING MEDIA STREAM AND OPERATION METHOD THEREFOR

(71) Applicant: Samsung Electronics Co., Ltd., Suwon-si (KR)

(72) Inventors: Hanmin Bang, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 18/364,107

(22) Filed: Aug. 2, 2023

(65) Prior Publication Data

US 2023/0379515 A1    Nov. 23, 2023

Related U.S. Application Data

(63) Continuation of application No. PCT/KR2021/020057, filed on Dec. 28, 2021.

(30) Foreign Application Priority Data

Feb. 8, 2021    (KR) ........................ 10-2021-0017683

(51) Int. Cl.
     *H04N 21/2368*     (2011.01)
     *H04N 21/2662*     (2011.01)

(52) U.S. Cl.
     CPC ..... *H04N 21/2368* (2013.01); *H04N 21/2662* (2013.01)

(58) Field of Classification Search
None
See application file for complete search history.

(56) References Cited

U.S. PATENT DOCUMENTS

2005/0248652 A1    11/2005    Firestone et al.
2006/0244812 A1    11/2006    Jeong
(Continued)

FOREIGN PATENT DOCUMENTS

JP    2015-133721 A    7/2015
JP    2016-006951 A    1/2016
(Continued)

OTHER PUBLICATIONS

International Search Report dated Apr. 1, 2022, issued in International Patent Application No. PCT/KR2021/020057.

*Primary Examiner* — Junior O Mendoza
(74) *Attorney, Agent, or Firm* — Jefferson IP Law, LLP

(57) ABSTRACT

A server is provided. The server includes a communication circuit and a processor configured to establish a communication connection to a plurality of client devices that have attended a conference room, receive pieces of network information from the plurality of client devices, identify, based on the pieces of network information, a plurality of first client devices to be included in a group from among the plurality of client devices, receive, from a master device among the plurality of identified first client devices, pieces of identification information, and a first video stream including a plurality of video streams associated with the plurality of client devices, identify, based on the pieces of identification information, the plurality of video streams included in the received first video stream, and transmit some of the plurality of video streams to some of the plurality of first client devices.

20 Claims, 20 Drawing Sheets

(56) References Cited

U.S. PATENT DOCUMENTS

| | | |
|---|---|---|
| 2014/0133836 A1 | 5/2014 | Burns |
| 2014/0267560 A1 | 9/2014 | Bright-Thomas |
| 2014/0267573 A1 | 9/2014 | Aziz |
| 2015/0029299 A1 | 1/2015 | Choi et al. |
| 2015/0181165 A1 | 6/2015 | Iltus |
| 2017/0070359 A1 | 3/2017 | Kanda et al. |
| 2017/0332043 A1 | 11/2017 | Chen et al. |
| 2018/0054596 A1 | 2/2018 | Gwock |
| 2018/0091744 A1 | 3/2018 | Takita et al. |
| 2018/0124132 A1 | 5/2018 | Assemaly Salama et al. |
| 2020/0389333 A1* | 12/2020 | Moorefield, Jr. ... H04L 12/1818 |
| 2021/0218932 A1 | 7/2021 | Cha |
| 2022/0174157 A1* | 6/2022 | Murali ................. H04M 3/568 |

FOREIGN PATENT DOCUMENTS

| | | |
|---|---|---|
| KR | 10-2015-0011886 A | 2/2015 |
| KR | 10-1770070 B1 | 8/2017 |
| KR | 10-1918674 B1 | 11/2018 |
| KR | 10-2020-0057562 A | 5/2020 |

\* cited by examiner

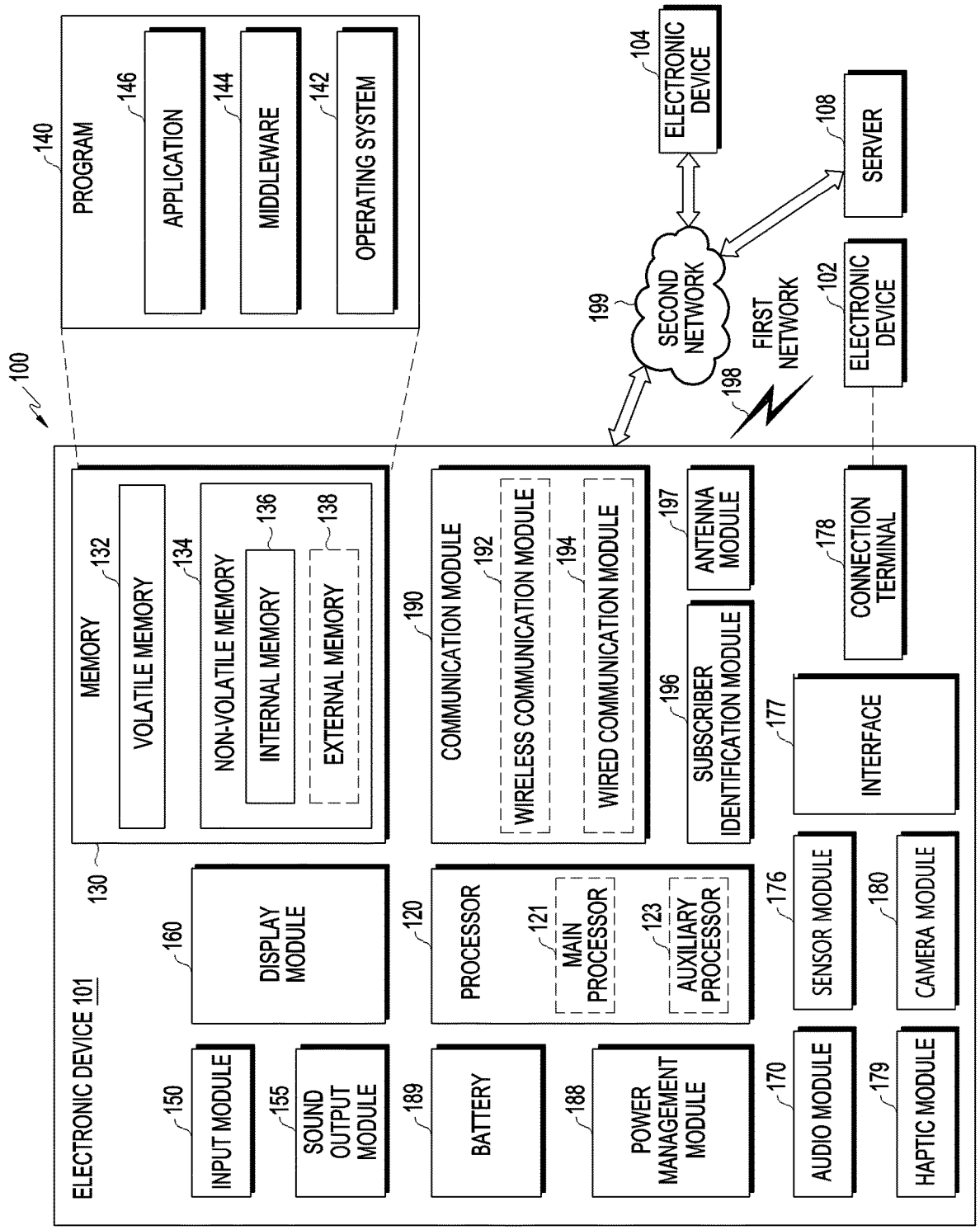

ELECTRONIC DEVICE FOR TRANSMITTING AND RECEIVING MEDIA STREAM AND OPERATION METHOD THEREFOR

CROSS-REFERENCE TO RELATED APPLICATION(S)

This application is a continuation application, claiming priority under § 365(c), of an International application No. PCT/KR2021/020057, filed on Dec. 28, 2021, which is based on and claims the benefit of a Korean patent application number 10-2021-0017683, filed on Feb. 8, 2021, in the Korean Intellectual Property Office, the disclosure of which is incorporated by reference herein in its entirety.

BACKGROUND

1. Field

The disclosure relates to an electronic device. More particularly, the disclosure relates to an electronic device for transmitting or receiving a media stream, and a method thereof.

2. Description of Related Art

A video conference may be a remote communication system in which two or more conference participants remotely hold a conference by using a display and a camera. Such a video conference enables convenient collaboration between people in different locations.

Video conference participants may access, using devices thereof, a server (e.g., a media server) provided for a video conference, and share media streams with devices of other conference participants via the server, so as to remotely hold the conference.

As usage of video conferences has recently increased, there is a demand for a technology for controlling media streams to be smoothly exchanged between devices of conference participants and servers provided for video conferences.

The above information is presented as background information only to assist with an understanding of the disclosure. No determination has been made, and no assertion is made, as to whether any of the above might be applicable as prior art with regard to the disclosure.

SUMMARY

A server (e.g., a media server) may establish a communication connection to client devices participating in a conference, and may receive media streams (e.g., video streams, audio streams, or graphics) from each of the client devices. However, if the number of client devices having established a communication connection to the server increases rapidly, since the amount of data of media streams transmitted to the server increases rapidly, excessive network traffic resources may be generated. In addition, if the client device configures the quality of the media stream (e.g., an image quality of a video stream) high for a video conference, the amount of data of the media stream transmitted between the client device and the server increases rapidly, resulting in excessive network traffic resources.

Aspects of the disclosure are to address at least the above-mentioned problems and/or disadvantages and to provide at least the advantages described below. Accordingly, an aspect of the disclosure is to provide an electronic device and a method thereof for enabling classification of client devices participating in a conference into a group by a media server, and enable reception of a video stream, which is obtained by merging video streams of other client devices, from a master device of the classified group, thereby saving network traffic resources.

Another aspect of the disclosure is to provide an electronic device and a method thereof for increasing the efficiency of use of network traffic resources by configuring an image quality of the video stream transmitted from the master device to the media server, based on a bandwidth between the master device and the media server.

Additional aspects will be set forth in part in the description which follows and, in part, will be apparent from the description, or may be learned by practice of the presented embodiments.

In accordance with an aspect of the disclosure, a server is provided. The server includes a communication circuit, and at least one processor configured to establish, using the communication circuit, communication connections to a plurality of client devices participating in a conference room, receive, from the plurality of client devices, a plurality of pieces of network information associated with the plurality of client devices by using the communication circuit, identify, based on the plurality of pieces of network information, a plurality of first client devices to be included in a group from among the plurality of client devices, receive, using the communication circuit, a first video stream including a plurality of video streams associated with the plurality of client devices and a plurality of pieces of identification information for identification of the plurality of video streams, from a master device among the identified plurality of first client devices—wherein the plurality of pieces of identification information correspond to the plurality of video streams, respectively—, identify the plurality of video streams included in the received first video stream, based on the plurality of pieces of identification information, and transmit. using the communication circuit, at least some of the plurality of video streams to at least some of the plurality of first client devices.

In accordance with another aspect of the disclosure, an electronic device is provided. The electronic device includes a communication circuit, and at least one processor configured to establish, using the communication circuit, a communication connection to a media server associated with a conference room—the conference room is associated with a plurality of external electronic devices—, transmit network information associated with the electronic device to the media server by using the communication circuit, receive, using the communication circuit, a plurality of pieces of first network information associated with the plurality of external electronic devices from the media server, based on transmitting the network information, receive, using the communication circuit from the plurality of external electronic devices, a plurality of video streams associated with the plurality of external electronic devices, based on the plurality of pieces of first network information, acquire a first video stream including the plurality of video streams, acquire a plurality of pieces of identification information for identification of the plurality of video streams included in the first video stream, and transmit the first video stream and the plurality of pieces of identification information to the media server.

In accordance with another aspect of the disclosure, a method of a server is provided. The method includes establishing, using a communication circuit, communication connections to a plurality of client devices participating in a conference room, receiving, from the plurality of client devices, a plurality of pieces of network information associated with the plurality of client devices by using the communication circuit, identifying, based on the plurality of pieces of network information, a plurality of first client devices to be included in a group from among the plurality of client devices, receiving, using the communication circuit, a first video stream including a plurality of video streams associated with the plurality of client devices and multiple pieces of identification information for identification of the plurality of video streams, from a master device among the identified a plurality of first client devices—the plurality of pieces of identification information correspond to the plurality of video streams, respectively—, identifying the plurality of video streams included in the received first video stream, based on the plurality of pieces of identification information, and transmitting at least some of the plurality of video streams to at least some of the plurality of first client devices by using the communication circuit.

In accordance with another aspect of the disclosure, a method of an electronic device is provided. The method includes establishing, using a communication circuit, a communication connection to a media server associated with a conference room—the conference room is associated with a plurality of external electronic devices—, transmitting network information associated with the electronic device to the media server by using the communication circuit, receiving, using the communication circuit, a plurality of pieces of first network information associated with the plurality of external electronic devices from the media server, based on transmitting the network information, receiving, using the communication circuit from the plurality of external electronic devices, a plurality of video streams associated with the plurality of external electronic devices, based on the plurality of pieces of first network information, acquiring a first video stream including the plurality of video streams, acquiring a plurality of pieces of identification information for identification of the plurality of video streams included in the first video stream, and transmitting the first video stream and the plurality of pieces of identification information to the media server.

According to various embodiments of the disclosure, an electronic device and a method thereof can be provided, in which a media server classifies client devices participating in a conference into a group, a video stream, which is obtained by merging video streams of other client devices, is received from a master device of the classified group, so that network traffic resources can be saved.

In addition, according to various embodiments of the disclosure, the electronic device and the method thereof can increase the efficiency of use of network traffic resources by configuring an image quality of the video stream transmitted from the master device to the media server, based on a bandwidth between the master device and the media server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device in a network environment according to an embodiment of the disclosure;

Throughout the drawings, it should be noted that like reference numbers are used to depict the same or similar elements, features, and structures.

DETAILED DESCRIPTION

Figure 2A:
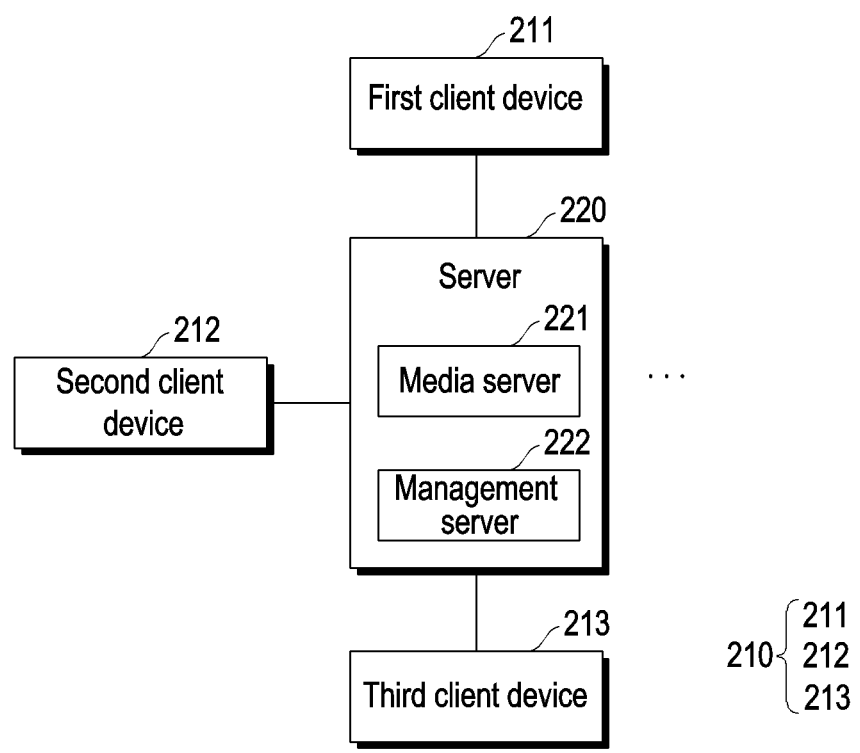
FIG. 2A is a diagram illustrating a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter, an example of a system according to various embodiments will be described. Here, the system may be defined as an aggregate including various types of independent electronic devices. Since descriptions of devices (e.g., the external electronic devices 101, 102, and 104) provided in the described network environment may be applied to descriptions of devices (e.g., client devices 211, 212, and 213, and a server 220) included in the system, which will be described below, duplicate descriptions are omitted.

FIG. 2A is a diagram illustrating a system according to an embodiment of the disclosure. The system is not limited to the devices illustrated in FIG. 2A, and may be configured to include more devices or fewer devices. Hereinafter, FIG. 2A will be described with reference to FIG. 2B.

Figure 2B:
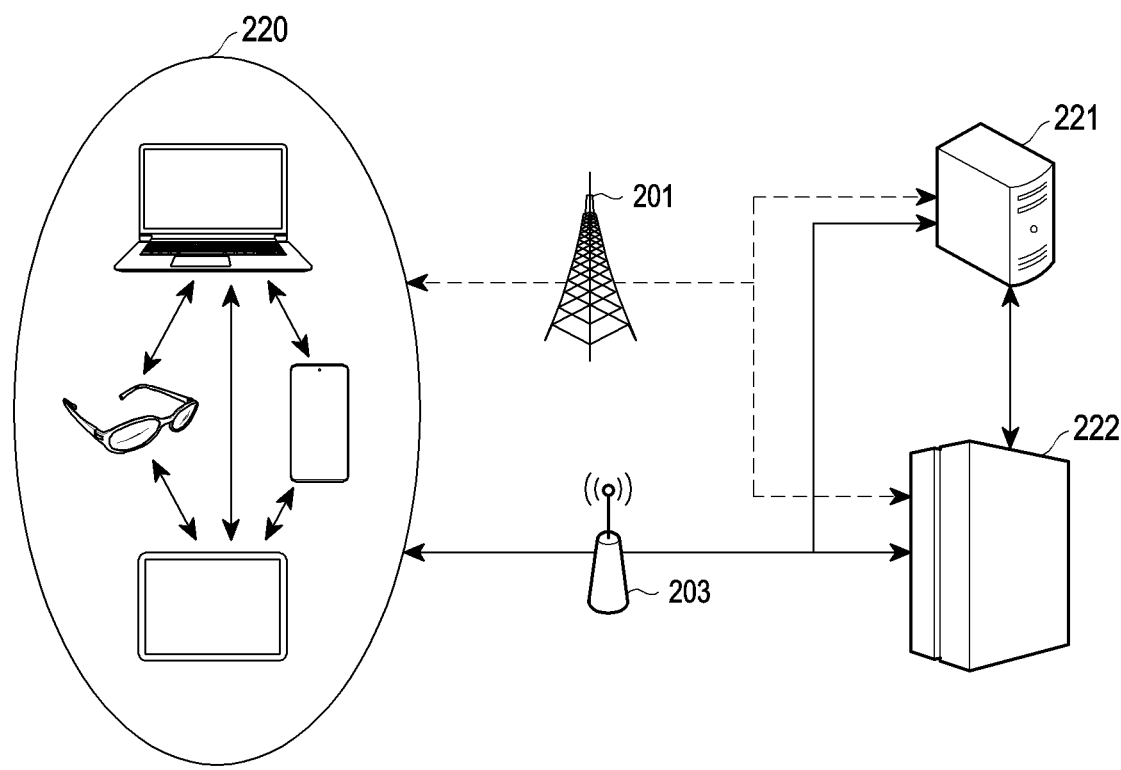
FIG. 2B is a diagram illustrating communication connections established between devices (e.g., a server and client devices) in a system according to an embodiment of the disclosure.

FIG. 2B is a diagram illustrating communication connections established between devices (e.g., a server and client devices) in a system according to an embodiment of the disclosure.

Referring to FIG. 2A, according to various embodiments of the disclosure, a system 200 may be a system configured for transmission and/or reception (or sharing) of designated information between devices (e.g., the client device 210 and a server 220) included in the system 200. For example, the transmitted and/or received information may include a media stream. The media stream may include various types of media contents, such as video, audio, and/or electronic graphics (e.g., an execution screen, hand writing written on the screen, or a graphic user interface (GUI)) having a series of continuity (temporal continuity or informational continuity). Respective devices included in the system 200 (e.g., the client device 210 and the server 220) may transmit and/or receive media streams from each other. Each of the devices included in system 200, which are not limited to descriptions herein, may transmit and/or receive various types of information, data, packets, and/or bits other than media streams. Hereinafter, for convenience of description, information transmitted and/or received in the system 200 is described as a media stream, but the following descriptions may be applied to other examples (e.g., examples of transmitting and/or receiving other various types of information, data, packets, and/or bits).

Referring to FIG. 2A, according to various embodiments of the disclosure, the system 200 may include the client device 210 and the server 220. There may be two or more client devices 210 and two or more servers 220 implemented in the system. Hereinafter, each of devices included in the system will be described.

First, the client device 210 will be described below. The term client device may be used interchangeably with the term electronic device.

According to an embodiment of the disclosure, since the client device 210 may be implemented in the same way as the electronic device 101 described above in FIG. 1, a description overlapping with that of the electronic device 101 is omitted. As illustrated in FIG. 2A, the client device 210 may include a portable terminal, such as a smartphone, various types of computers, such as desktop computers, tablet computers, laptop computers, and notebook computers including standard notebooks, Ultrabooks, netbooks, and Tabbooks, and/or augmented reality (AR)/virtual reality (VR)/mixed reality (MR) glasses, but is not limited thereto.

According to an embodiment of the disclosure, the client device 210 may transmit a media stream to the outside (e.g., the server 220 or another client device) and receive another media stream from the outside.

In an embodiment of the disclosure, a client device (e.g., one of the client devices 210) may establish a communication connection to an external device (e.g., the server 220 and/or another client device (e.g., the client devices 212 and 213)).

Referring to FIG. 2B, the client device 210 may establish a communication connection to the server 220, based on a communication connection scheme (e.g., third generation (3G), LTE, and or 5G) using cellular communication using a base station 201, a communication scheme (e.g., Wi-Fi communication) using an access point (AP) 203, and/or a communication scheme (not illustrated) (e.g., Wi-Fi direct or Bluetooth), and may transmit a media stream to the server 220 and/or receive a media stream from the server 220. Although not illustrated, the client devices 211, 212, and 213 may establish communication connections to each other, based on the described communication schemes. Although described later, network information may be configured for the client devices 210 for which communication connections are established, and this will be described with reference to FIG. 3.

In addition, in an embodiment of the disclosure, the client device 210 may generate a media stream and transmit the same to an external device (e.g., the server 220 and/or another client device (e.g., the client device 212 or 213)). For example, although described later, the client device 210 may acquire and/or generate various types of media contents (e.g., video, audio, and screen) by using various types of input modules (e.g., a camera, a microphone, and a touch screen) included in the client device 210. A client device (e.g., the client device 211) may transmit a media stream including a media content acquired and/or generated in real time to the outside via a communication content established with an external device (e.g., the server 220 and/or another client device (e.g., the client device 212 or 213)).

In addition, in an embodiment of the disclosure, the client device 210 may receive a media stream from an external device (e.g., the server 220 and/or another client device (e.g., the client device 212 or 213)). For example, a client device (e.g., the client device 211) may receive a media stream generated by another client device (e.g., the client device 212 or 213) via a communication connection established to another client device (e.g., the client device 212 or 213). In addition, for example, a client device (e.g., the client device 211) may receive a media stream generated by another client device (e.g., the client device 212 or 213) from the server 220 via a communication connection established to the server 220.

According to an embodiment of the disclosure, the client device 210 may establish a communication connection to an external device (e.g., the server 220 and other client devices), based on a communication framework and/or a communication protocol for transmission and/or reception of a media stream. The communication protocol may include Internet streaming protocols, such as per-text transfer protocol (HTTP) streaming, real-time transport protocol (RTP)/real-time transport control protocol (RTCP)/real-time streaming protocol (RTSP) streaming, multimedia messaging service (MMS), and real-time messaging protocol (RTMP), or streaming protocols for digital broadcasting, such as a moving picture expert group (MPEG) streaming. The communication framework may include interactive connectivity establishment (ICE). The ICE is a network address translation (NAT) traversal technology for transmitting and/or receiving real-time media streams, and may use session traversal utilities for NAT (simple traversal of UDP through NAT(STUN), request for comments (RFC) 5389) and traversal using relay NAT (TURN, RFC 5766). Communication connection establishment based on the communication protocol and/or the communication framework of the client device 210 may be performed by an application (API), such as web real-time communication (Web-RTC) called by the client device 210, but is not limited thereto.

According to an embodiment of the disclosure, the client device 210 may receive a program (or executable computer code, instructions, and processes) for transmitting and/or receiving a media stream from the server 220. The program may be configured to provide a graphical user interface (GUI). The user graphic interface may include an area for displaying a video stream among media streams received from the outside and icons for controlling reproduction of the media stream.

Hereinafter, the server 220 according to an embodiment will be described.

According to an embodiment of the disclosure, as illustrated in in FIG. 2A, the server 220 may include two or more servers (e.g., a media server 221 and a management server 222) for providing different functions. Alternatively, without being limited to the description, the server 220 may be implemented as a single server (e.g., a server configured to provide both a function of the media server 221 and a function of the management server 222) for providing each function.

According to an embodiment of the disclosure, the media server 221 may operate to share (or transmit and/or receive) media streams between the client devices 211, 212, and 213. For example, the media server 221 may receive media streams from the client devices 210 participating in a designated conference room, and the media server 221 may transmit some of the received media streams in response to a request (e.g., a request to receive a media stream of a designated client device) of the client devices 210. The conference room is a type of an electronic category for classifying multiple client devices for transmitting and/or receiving (or sharing) media streams with each other, and may be generated and/or managed by the management server 222 to be described below. An operation of receiving and transmitting media streams by the media server 221 may be based on network information (e.g., ICE candidate information and/or a port number) of the client device 210. The operation of the media server 221 will be described below. In addition, the media server 221 may perform an operation of classifying some of the plurality of client devices participating in the conference room into one group and separating an integrated video stream received from a master device of the group, and this will be described below.

According to an embodiment of the disclosure, the management server 222 may open a conference room in response to a request for opening the conference room, which is received from the client device 210. In addition, the management server 222 may add the client device 210 to a designated conference room in response to a request for participation in the conference room. In addition, the management server 222 may store and/or manage information associated with the conference room. The information associated with the conference room may include identification information of the conference room, a password of the conference room, and/or information (e.g., network information for the media server) for establishing a communication connection to a media server assigned to the conference room. The operation of the media server 222 will be described below.

Hereinafter, descriptions will be provided for an example of network information assigned according to a communication connection established between devices (e.g., the server 220 and the client device 210) included in the system 200 according to an embodiment.

Figure 3:
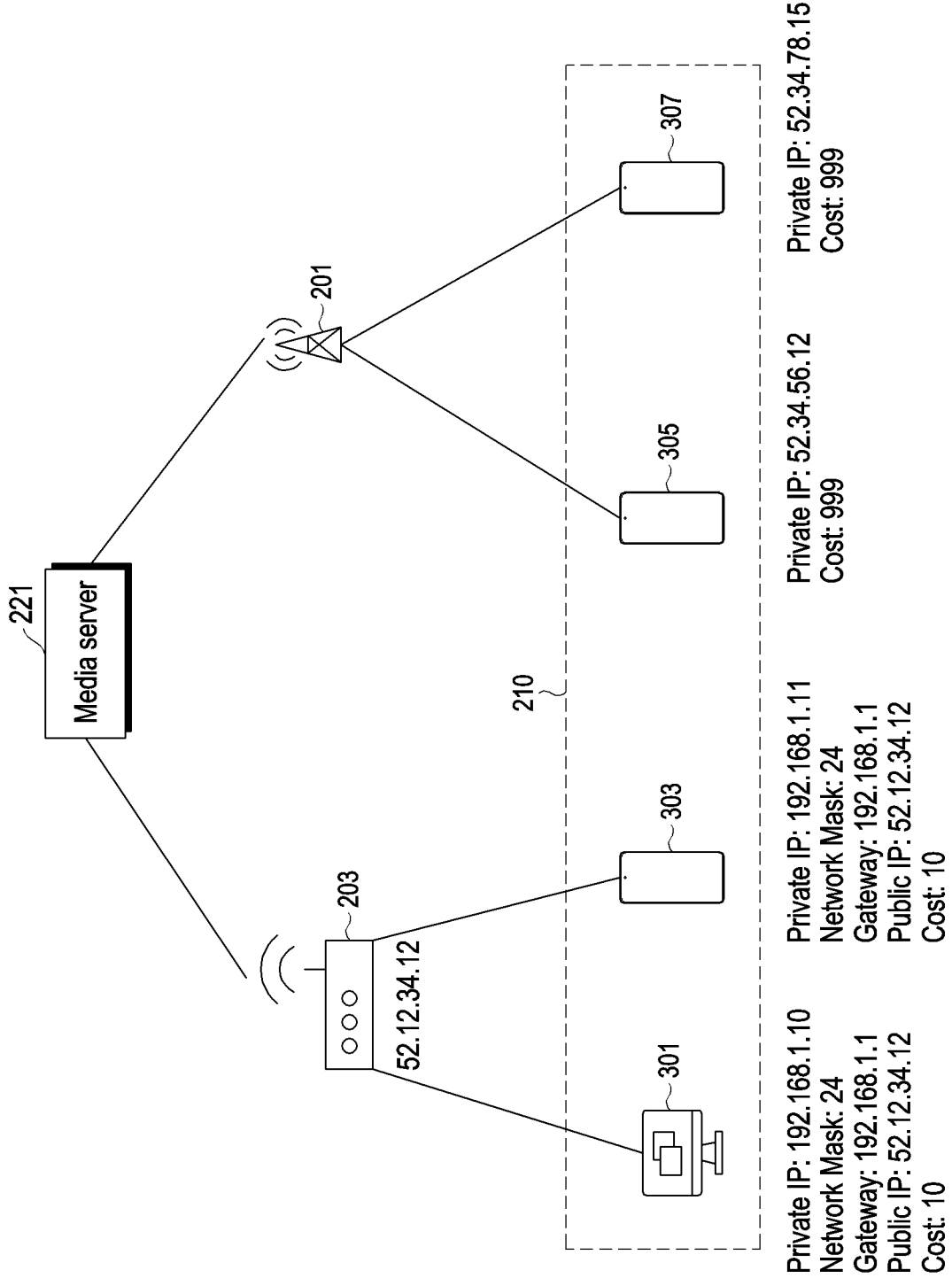
FIG. 3 is a diagram illustrating network information configured for devices included in a system according to an embodiment of the disclosure.

FIG. 3 is a diagram illustrating network information configured for devices included in a system according to an embodiment of the disclosure. Values of internet protocol (IP) addresses and cost information illustrated in FIG. 3 are merely examples and may be configured to be various values.

Referring to FIG. 3, as described above in FIG. 2B, client devices 301, 303, 305, and 307 may establish a communication connection to the server 220, based on a communication connection method scheme (e.g., 3G, LTE, or 5G) using cellular communication using the server 220 (e.g., the media server 221) and the base station 201, a communication connection scheme (e.g., Wi-Fi communication) using an access point (AP) 203, and/or a communication connection scheme (not illustrated) (e.g., Wi-Fi direct or Bluetooth) for direct communication connection establishment.

According to an embodiment of the disclosure, referring to FIG. 3, network information may be configured for the client devices 301, 303, 305, and 307 according to the communication connection schemes. For example, the network information may include IP address information (e.g., a private IP address, a public IP address, a gateway IP address (or an internal NAT IP address), and a local host IP address), network interface information (e.g., network mask), and/or cost information, which are configured according to a communication connection scheme used by the client devices. The cost information may be configured according to a type (e.g., the communication connection scheme using cellular communication or communication scheme using AP, disclosed in FIG. 2A) of the used communication connection scheme and, for example, a value of the cost information may be configured in proportion to a degree of billing charge for each type of communication scheme. For example, values (e.g., 10) of cost information configured for the first client device 301 and the second client device 303, which use the communication scheme (e.g., Wi-Fi communication) using the access point (AP) 201, may be smaller than values (e.g., 999) of cost information configured for the first client device 305 and the second client device 307 which use the cellular communication using the base station 201. In addition, configuration of IP addresses for the client devices 301, 303, 305, and 307 may be performed in the same manner as known art, and duplicate descriptions are thus omitted. The network information is not limited to the descriptions, and although described later, the network information may further include a port number.

According to an embodiment of the disclosure, client devices (e.g., the client devices 301, 303, 305, and 307) may exchange the network information by using a group management module (a group management module 411 of FIG. 4) using an ICE framework (or a program (e.g., ICE agent (not illustrated) for driving the ICE framework), and this will be described below.

Hereinafter, examples of configurations of the client device 210 and the servers 220 (e.g., the media server 221 and the management server 222) according to an embodiment will be described.

Figure 4:
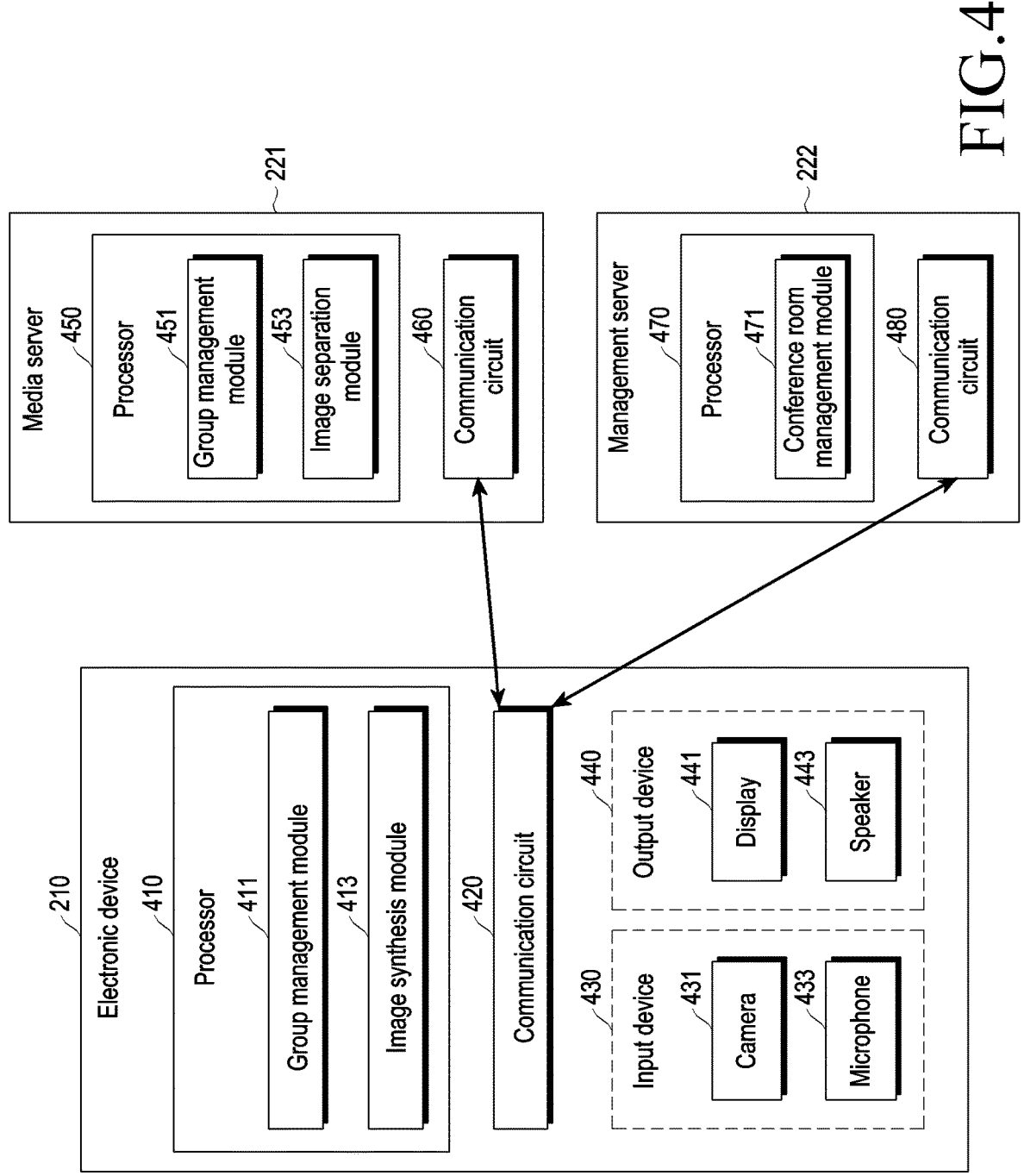
FIG. 4 is a block diagram illustrating configurations of a client device and an example of configurations of servers according to an embodiment of the disclosure.

FIG. 4 is a block diagram illustrating configurations of client device and an example of configurations of servers according to an embodiment of the disclosure. However, the client device 210 and the servers (e.g., the media server 221 and the management server 222) are not limited to the configurations illustrated in FIG. 4, and may be configured to include more devices or fewer devices.

Hereinafter, an example of the configuration of the client device 210 will be described first.

Referring to FIG. 4, the client device 210 (or the electronic device 210) may include a communication circuit 420, an input module 430 including a camera 431 and a microphone 433, an output module 440 including a display 441 and a speaker 443, and/or a processor 410 including a group management module 411 and an image synthesis module 413.

According to an embodiment of the disclosure, the communication circuit 420 may establish a communication connection to an external device (e.g., the server 220 and other client devices), based on the aforementioned communication schemes (e.g., the communication schemes described in FIG. 2B) and the aforementioned communication protocols. The communication circuit 420 may be implemented as the communication module 190 described above in FIG. 1, and duplicate descriptions are thus omitted.

According to an embodiment of the disclosure, the input modules 430 may acquire and/or generate media streams (e.g., video streams, audio streams, and/or graphics). For example, the client device 210 may acquire and/or generate a video stream by capturing an image in real time by using the camera 431. The camera 431 may be implemented as the camera module 180 described with reference to FIG. 1, and duplicate descriptions are thus omitted. In addition, for example, the client device 210 may receive audio and/or sound from an external environment in real time via the microphone 433, and may acquire and/or generate an audio stream based on the received audio and/or sound. In addition, for example, although not illustrated, the client device 210 may acquire graphics (e.g., hand writing) generated in real time by a user's input (e.g., an input by a body part (e.g., a finger) or an input by an electronic pen) received via a touch screen (not illustrated). Media streams acquired by the input modules 430 may be encoded by an encoder (not illustrated) included in the client device 210. The input modules 430 may be controlled by driving and/or execution of a program for a video conference to be described later, so as to acquire media streams as described above.

According to an embodiment of the disclosure, the output modules 440 may output media streams (e.g., video streams, audio streams, and/or graphics) so as to enable a user to experience the media streams. For example, the client device 210 may display a graphic user interface including a video stream on the display 441 (or a touch screen). The display 441 may be implemented as the display module 160 described with reference to FIG. 1, and duplicate descriptions are thus omitted. In addition, for example, the client device 210 may output an audio stream by using the speaker 443. The speaker 443 may be implemented as the speaker of the sound output module 155, and duplicate descriptions are thus omitted. The output modules 440 may be controlled by driving and/or execution of a program for a video conference to be described later, so as to provide media streams to a user as described above.

According to an embodiment of the disclosure, at least some of the modules (e.g., the management module 411 and the image synthesis module 413) included in the processor 410 of the client device 210 may be implemented (e.g., executed) by software, firmware, hardware, or a combination of two or more thereof. For example, the modules may be stored in the client device 210 in the form of applications, programs, computer codes, instructions, routines, or processes which are executable by the processor 410 of the client device 210. When the modules are executed by the processor 410, the modules may cause the processor 410 to perform operations associated with the modules. At least some of the illustrated modules may not be implemented in the processor 410. For example, in addition, the processor 410 may be implemented as the processor 120 described with reference to FIG. 1, and duplicate descriptions are thus omitted. Hereinafter, respective modules will be described.

According to an embodiment of the disclosure, the group management module 411 may identify whether the client device 210 and other client devices are included in a designated group, and may be configured to acquire and/or manage (e.g., store) information (hereinafter, referred to as group information) on the designated group, based on a result of the identification. Although described later, the group is a type of category for classification of multiple client devices, and among multiple client devices having established communication connections (or participating in a designated conference room) to the media server 221, some client devices capable of transmitting and/or receiving media streams between each other may be included (or classified into the group) in the group. For example, the group management module 411 may transmit ICE candidate information to the media server 221 by using an ICE framework (or based on a program (e.g., ICE agent (not illustrated) for driving the ICE framework), and may receive, from the media server 221, information (hereinafter, group candidate information) on a candidate client device that is likely to be included in the same group in which the client device 210 is included. A detailed operation of transmitting group candidate information to the client device 210 by the media server 221 will be described later with reference to FIGS. 7, 8A to 8C, and 9. The group candidate information may include network information (e.g., IP information and a port number) for another client device and a request code used for a connectivity check. The group management module 411 may perform a connectivity check with respect to another client device, based on the group candidate information, and may receive group information from the media server 221 if it is identified, as a result of the connectivity check, that another client device is connected. A connectivity test operation of the client device 210 will be described later with reference to FIGS. 7, 8A to 8C, and 9. The group information may include information on multiple client devices included in a designated group in which the current client device 210 is included, information on a master device (or leader) of the designated group, and/or information on a slave device of the designated group. The master device of the group may be configured to receive media streams from other slave devices of the group. Selecting the master device and the slave devices will be described later with reference to FIGS. 7, 8A to 8C, and 9. The client device 210 may identify, based on the group information, whether the client device 210 is a master device or is a slave device of the group, and may integrate media streams or transmit media streams according to a result of the identified. This will be described later with reference to FIGS. 10 to 12.

According to an embodiment of the disclosure, the image synthesis module 413 may acquire and/or generate a single video stream (or multiple video streams are merged), based on multiple video streams received from other client devices, and may transmit the single video stream to the media server 212. The single video stream may be defined as a merged video stream for convenience of description. In an embodiment of the disclosure, the single video stream acquired and/or generated by the image synthesis module 413 may include multiple areas and may include a sub video stream for each of the plurality of areas. For example, the video synthesis module 413 may convert video qualities of multiple video streams received from other client devices so as to generate multiple sub video streams having the converted video qualities. The video synthesis module 413 may generate a single video stream by arranging the generated multiple video streams for respective areas. The video quality may include at least one of a resolution and a frame rate. The video quality of the sub video stream may be configured according to a communication state (e.g., bandwidth) between the client device 210 and the media server 221, and this will be described later with reference to FIGS. 13 and 4. The video synthesis module 413 may generate predetermined identification information for separation (or identification) of the sub video streams arranged for respective areas of the single video stream, and may transmit the identification information and the single video stream to the media server 221. The plurality of pieces of identification information will be described below with reference to FIGS. 10 to 12. The image synthesis module 413 may be implemented or driven if the client device 210 is a master device, but is not limited thereto. For example, even if the client device 210 is a slave device, the client device 210 may combine video streams received from other client devices by using the image synthesis module 413 and transmit the same to a master device.

Hereinafter, an example of the configuration of the media server 221 will be described below.

According to an embodiment of the disclosure, referring to FIG. 4, the media server 221 may include a communication circuit 460, and a processor 450 including a group generation module 451 and an image separation module 453.

According to an embodiment of the disclosure, the communication circuit 460 may establish a communication connection to an external device (e.g., the client devices 210), based on the aforementioned communication schemes (e.g., the communication schemes described in FIG. 2B) and the aforementioned communication protocols. The communication circuit 460 may be implemented as the communication module 190 described above in FIG. 1, and duplicate descriptions will be thus omitted.

According to an embodiment of the disclosure, the processor 450 may be implemented as the aforementioned processor 410 of the client device, and duplicate descriptions are thus omitted. Hereinafter, modules included in the processor 450 (e.g., the group generation module 451 and the image separation module 453) will be described.

According to an embodiment of the disclosure, the group generation module 451 may classify, into each group, multiple client devices for which communication connections to the media server 221 have been established. For example, the group generation module 451 may identify some client devices among the plurality of client devices to be classified into (or included in) a group, based on ICE candidate information and a port number for each of the plurality of client devices, which are received from the plurality of client devices. The group generation module 451 may compare at least one of public IP addresses and private IP addresses included in the ICE candidate information for each of the plurality of client devices, so as to identify candidate client devices which are likely to be classified into a group from among the plurality of client devices. The identifying of the candidate client devices of the media server 221 will be described later with reference to FIGS. 7, 8A to 8C, and 9. The group generation module 451 may transmit group candidate information to each of the candidate client devices, and may enable a connectivity test to be performed in the candidate client devices, based on transmission of the group candidate information. The connectivity test operation of the client device 210 identified as the candidate client device will be described later with reference to FIGS. 7, 8A to 8C, and 9. The group generation module 451 may determine, based on a result of the connectivity test, whether the candidate client devices are classified into (or included in) a group, and may transmit group information to the candidate client devices if the candidate client devices are included in a group. Identifying a master device and a slave device among the plurality of client devices included in a group by the media server 221 will be described later with reference to FIGS. 7, 8A to 8C, and 9.

According to an embodiment of the disclosure, the image separation module 453 may separate a single video stream received from a master device, based on multiple pieces of identification information, and may acquire and/or identify multiple pieces of video streams acquired and/or generated by multiple client devices included in a group. Although described later, the plurality of pieces of video streams may include identification information (area identification information) for identification of each of multiple areas included in the single video stream and identification information (e.g., IDs, codes, or identifiers) (device identification information) of the client devices, which correspond to the respective multiple areas.

Hereinafter, an example of the configuration of the management server 222 will be described below.

According to an embodiment of the disclosure, referring to FIG. 4, the management server 222 may include a communication circuit 480, and a processor 470 including a conference room management module 471.

According to an embodiment of the disclosure, the communication circuit 480 may establish a communication connection to an external device (e.g., the client devices 210), based on the aforementioned communication schemes (e.g., the communication schemes described in FIG. 2B) and the aforementioned communication protocols. The communication circuit 480 may be implemented as the communication module 190 described above in FIG. 1, and duplicate descriptions will be thus omitted.

According to an embodiment of the disclosure, the processor 470 may be implemented as the aforementioned processor 410 of the client device 210, and duplicate descriptions are thus omitted. According to an embodiment of the disclosure, the conference room management module 471 may generate a conference room for transmission and/or reception of a media stream in response to a request of the client device 210. The conference room management module 471 may assign the media server 221 to the generated conference room. Multiple client devices participating in the generated conference room may establish a communication connection to the media server 221 assigned to the conference room. The conference room management module 471 may store and/or manage information associated with the generated conference room. The information associated with the conference room may store and/or manage identification information (e.g., a code and/or an ID) of the conference room, a password for accessing the conference room, information on the media server 221 assigned to the conference room, and/or identification information (e.g., codes and/or IDs of the plurality of client devices) of the plurality of participating client devices.

Hereinafter, examples of operations of the client device 210 and the servers 220 (e.g., the media server 221 and the management server 222) according to an embodiment will be described.

According to an embodiment of the disclosure, the client device 210 may request the management server 222 to open a conference room. The management server 222 may open a conference room in response to the request for opening the conference room, and may assign the media server 221 to the opened conference room. When other client devices participate in the opened conference room, the client device 210 and the other client devices establish communication connections to the media server 221, and may transmit and/or receive media streams via the media server 221.

Figure 5:
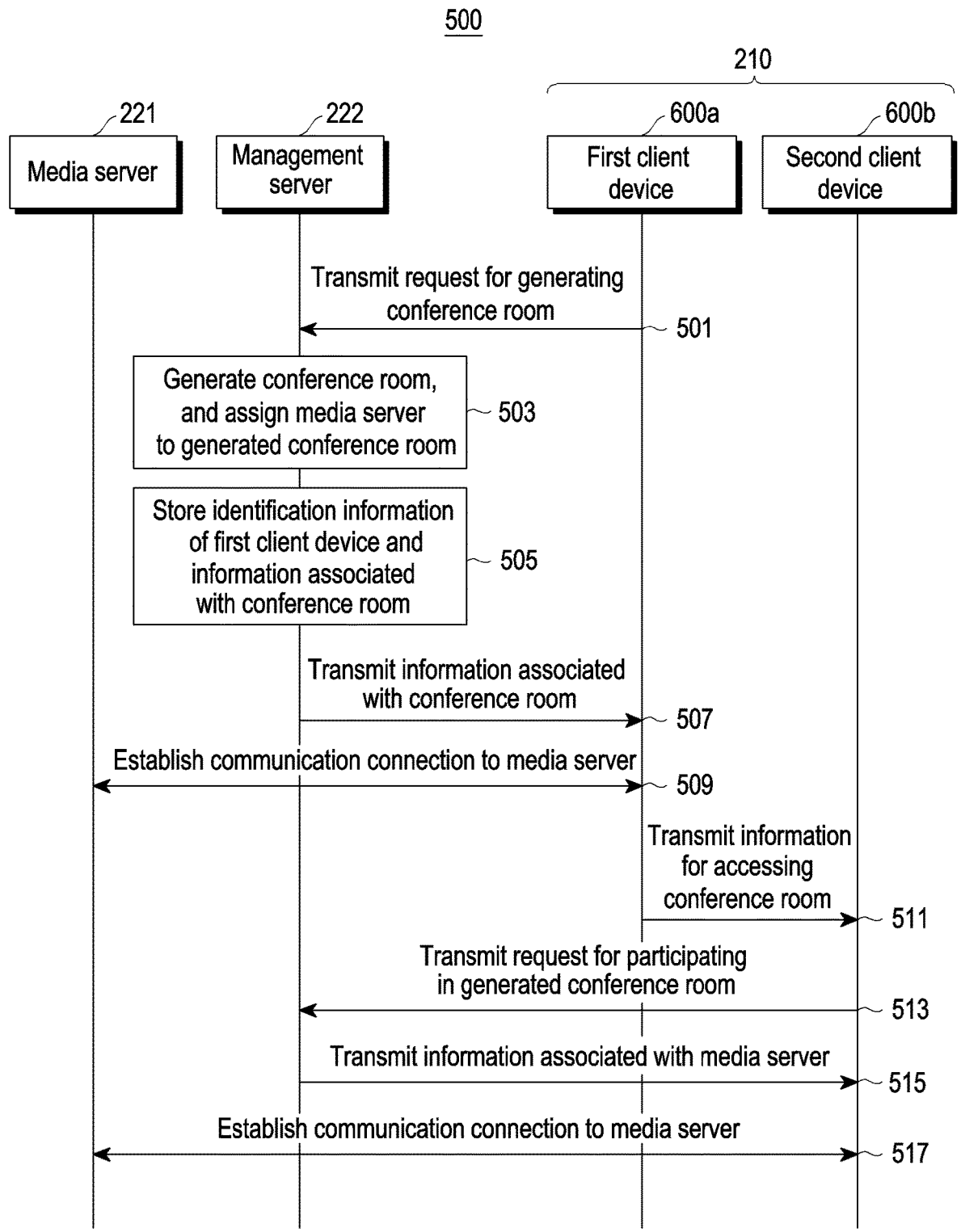
FIG. 5 is a flowchart illustrating operations of client devices and servers (e.g., a media server and a management server) according to an embodiment of the disclosure.

FIG. 5 is a flowchart 500 illustrating operations of a client device 210 and servers 220 (e.g., a media server and a management server) according to an embodiment of the disclosure. The operations illustrated in FIG. 5 are not limited to the illustrated order and may be performed in various orders. According to an embodiment of the disclosure, more operations or at least one fewer operation than those illustrated in FIG. 5 may be performed. Hereinafter, FIG. 5 will be described with reference to FIGS. 6A and 6B.

Figure 6A:
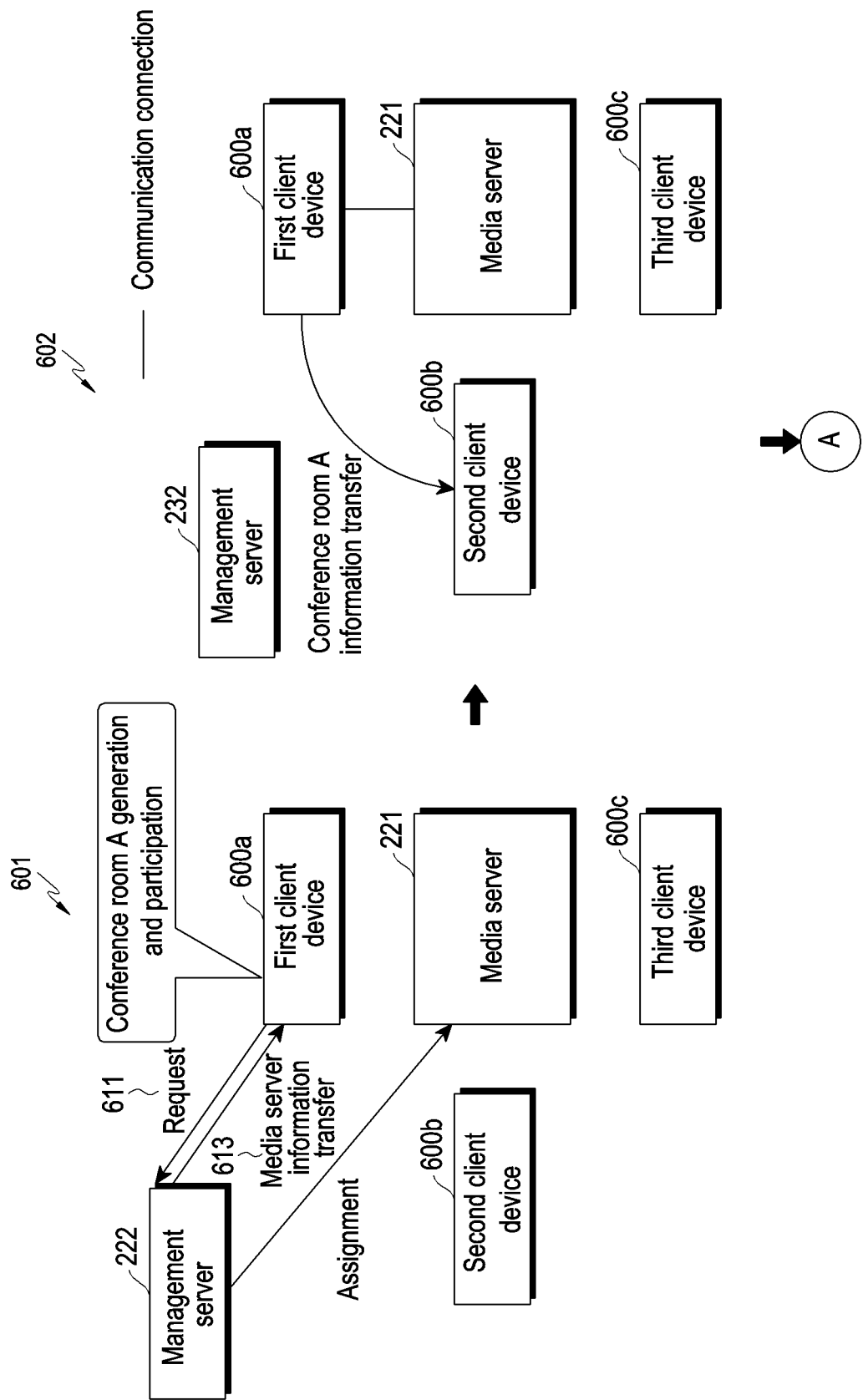
FIG. 6A is a diagram illustrating an opening a conference room and transferring conference room information by client devices and/or servers (e.g., a media server and a management server) according to an embodiment of the disclosure.
Figure 6B:
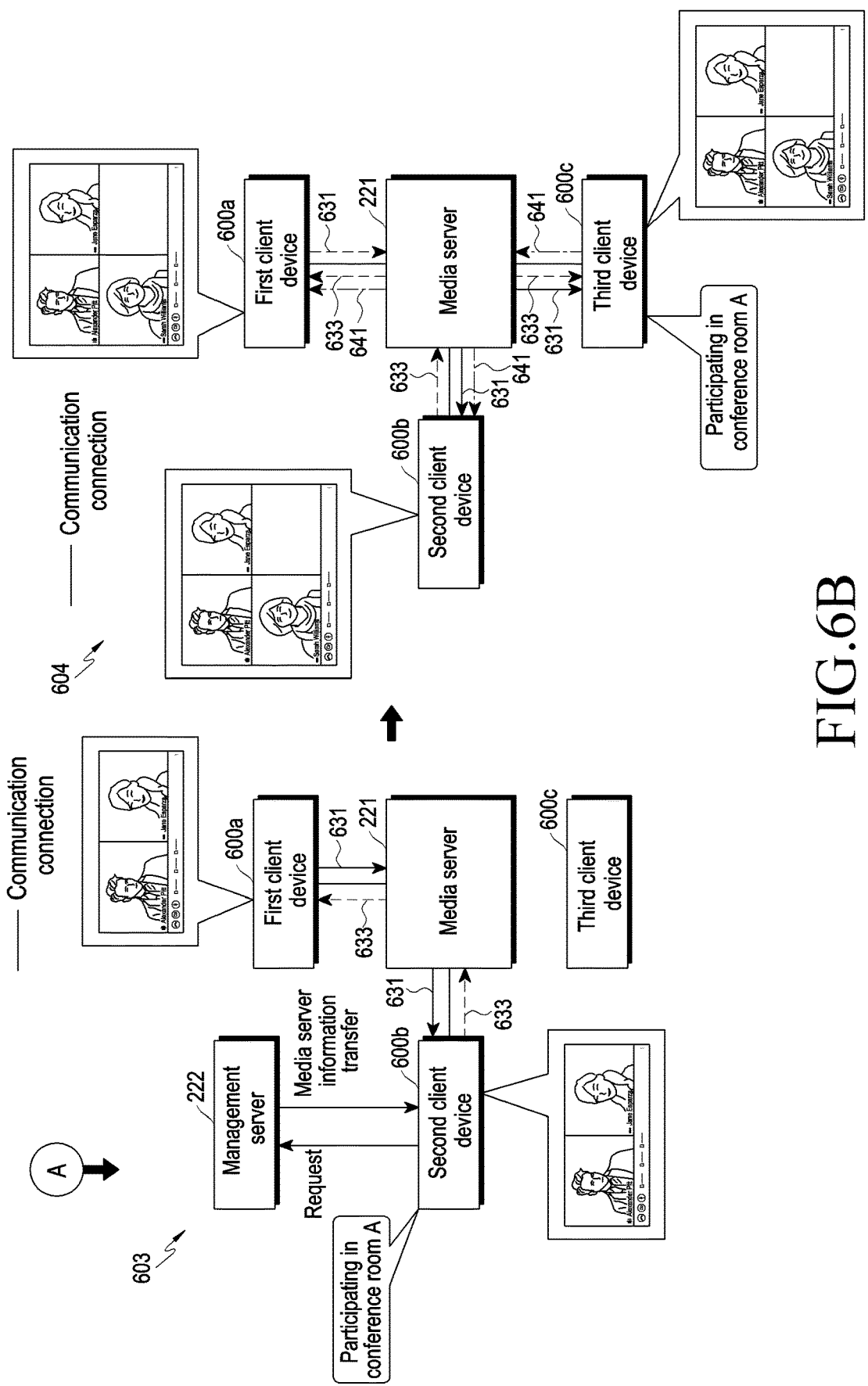
FIG. 6B is a diagram illustrating sharing media streams between client devices participating in a conference room which includes servers (e.g., a media server and a management server) and the client devices according to an embodiment of the disclosure.

FIG. 6A is a diagram illustrating opening a conference room and transferring conference room information by a client device and/or servers (e.g., a media server and a management server) according to an embodiment of the disclosure. FIG. 6B is a diagram illustrating sharing media streams between client devices participating in a conference room of a client device and/or servers (e.g., a media server and a management server) according to an embodiment of the disclosure.

Referring to FIGS. 6A and 6B, according to an embodiment of the disclosure, the client device 210 (e.g., a first client device 600a) may transmit a request for generating a conference room to the management server 222 in operation 501. For example, the first client device 600a may receive a program (or application) for a video conference from the management server 222 (or another external server) and execute the received program. The program for the video conference may be implemented in the same way as known art, and a detailed description thereof is thus omitted. The first client device 600a may transmit a request 611 for generating a conference room to the management server 222 as illustrated in 601 of FIG. 6A, in response to reception of a user's input (e.g., an input for selecting an icon for opening of a conference room on an execution screen) for opening a conference room on an execution screen of an executed program. When the request 611 is transmitted, the first client device 600a may transmit the request 611 and identification information (e.g., an ID, a code, and/or an identifier) of the first client device 600a. The identification information of the first client device 600a may include at least one of a unique identifier (e.g., unique identifier (UID)) configured for the device, identification information (e.g., an identity (ID) generated for a video conference) generated using the program by the first client device 600a, or identification information assigned to the first client device 600a by the management server 222, but is not limited thereto.

According to an embodiment of the disclosure, the management server 222 may generate a conference room (e.g., conference room A) in operation 503 and assign the media server 221 to the generated conference room. For example, the management server 222 may generate a conference room (e.g., conference room A) for a video conference, and may generate identification information (e.g., an ID or a code) for the generated conference room (e.g., conference room A) and a password for authentication when accessing the generated conference room (e.g., conference room A). The conference room may be a type of an electronic category for classification of multiple client devices for transmitting and/or receiving (or sharing) media streams with each other. For example, only multiple client devices connected to the conference room may transmit and/or receive media streams between each other. The management server 222 may identify the available (e.g., not assigned to another conference room) media server 221 among multiple media servers 221 implemented in a system (e.g., the system 200 of FIG. 2A), and may assign the identified media server 221 to the generated conference room (e.g., conference room A), as illustrated in reference numeral 601 of FIG. 6A.

According to an embodiment of the disclosure, the management server 222 may store, in operation 505, identification information of the first client device 600a participating in the conference room and information associated with the conference room, and may transmit the information associated with the generated conference room (e.g., conference room A) in operation 507. For example, the management server 222 may store, in a database of the management server 222, and/or manage information on a list of client devices included in (or participating in) the generated conference room (e.g., conference room A). The information on the list may include identification information (e.g., IDs, codes, and/or identifiers) of the client devices participating in the conference room. Based on the conference room being generated (or after generation of the conference room), the management server 222 may include (or allow participation), in the reference room, the first client device 600a having transmitted the request for generating the conference room, and may acquire and store and/or manage identification information of the first client device 600a (e.g., adding the identification information of the first client device 600a to information on the list of the client devices participating in the conference room). Based on the conference room being generated (or after generation of the conference room), the management server 222 may store, in the database, and/or manage information 613 associated with the generated conference room (e.g., conference room A). The information 613 associated with the conference room may include identification information of the conference room, a password of the conference room, and/or information (e.g., network information for the media server 221) for establishing a communication connection to the media server 221 assigned to the conference room. The management server 222 may transmit the information 613 associated with the conference room (e.g., identification information of the conference room, a password of the conference room, and/or information for establishing a communication connection to the media server 221 assigned to the conference room) to the first client device 600a.

According to an embodiment of the disclosure, the client device 210 (e.g., the first client device 600a) may establish a communication connection to the media server 221, in operation 509, based on the received information associated with the conference room. For example, based on information (e.g., network information for the media server 221) for establishment of the communication connection to the media server 221, which is included in the received information 613 associated with the conference room, the first client device 600a may establish the communication connection to the media server 221 as illustrated in reference numeral 602 of FIG. 6A. As illustrated in reference numeral 603 of FIG. 6B, the first client device 600a may transmit a media stream 631 to the media server 221 via the established communication connection to the media server 221. Based on the execution of the program described in operation 501, the first client device 600a may generate the media stream 631 by using the input modules (e.g., the input module 430 of FIG. 4) and may transmit the generated media stream 631 to the media server 221. As described above, the media stream may include various types of media contents, such as video, audio, and/or electronic graphics (e.g., an execution screen, hand writing written on the screen, or a graphic user interface (GUI)) having a series of continuity (temporal continuity or informational continuity).

According to an embodiment of the disclosure, the client device 210 (e.g., the first client device 600a) may transmit information for accessing the conference room to another client device (e.g., a second client device 600b) in operation 511. In an embodiment of the disclosure, as illustrated in reference numeral 602 of FIG. 6A, the first client device 600a may transmit the identification information of the conference room and/or the password of the conference room, as the information (conference room A information) for accessing the conference room, to the second client device 600b. The first client device 600a may transmit the identification information of the conference room and/or the password of the conference room to the second client device 600b by using a program for transmitting information, such as a message program or a messenger program (or application). In another embodiment of the disclosure, the first client device 600a may transmit, when selected, a link configured to transmit a request for access to the media server 222 and participation in the generated conference room (e.g., conference room A), as the information for accessing the conference room, to the second client device 600b. The link may include the identification information of the conference room and/or the password of the conference room. When the link is selected, the identification information of the conference room and/or the password of the conference room may be automatically referred to.

According to an embodiment of the disclosure, another client device (e.g., the second client device 600b) may transmit, in operation 513, the request for participation in the generated conference room (e.g., conference room A), may receive the information on the media server 221 from the management server 222 in operation 515, and may establish a communication connection to the media server 221 in operation 517. For example, as illustrated in reference numeral 603 of FIG. 6B, based on the reception of the information for accessing the conference room, the second client device 600b may transmit a request for participation in the conference room (e.g., conference room A) corresponding to the identification information of the conference room, which is received by the management server 222. As described in operation 501, transmission of the request of the second client device 600b may be based on driving and/or execution of a video conference program by the second client device 600b. In response to reception of the request, the management server 222 may transmit information on the media server 221 assigned to the participation-requested conference room to the second client device 600b. The information on the media server 221 may include information for communication connection establishment to the media server 221, and may include, for example, network information (e.g., an IP address) of the media server 221. The management server 222 may include (or allow participation of) the second client device 600b in the conference room, and may acquire and store and/or manage identification information of the second client device 600b (e.g., adding the identification information of the second client device 600b to information on the list of the client devices participating in the conference room). Based on the information for communication connection establishment to the media server 221, the second client device 600b may establish a communication connection to the media server 221, and may transmit a second media stream 633 acquired and/or generated by the second client device 600b to the media server 221. As described above, the remaining other client device 210 (e.g., a third client device 600c) may also participate in the generated conference room (e.g., conference room A) as illustrated in reference numeral 604 of feature, 6B, and establish a communication connection to the media server 221, so as to transmit a third media stream 641 acquired and/or generated by the third cs 600c to the media server 221.

According to an embodiment of the disclosure, the plurality of client devices 600a, 600b, and 600c participating in the conference room (e.g., conference room A) may exchange media streams via the media server 221. For example, as illustrated in reference numeral 604 of FIG. 6B, the first client device 600a may receive the second media stream 633 of the second client device 600b and the third media stream 641 of the third client device 600c from the media server 221. The first client device 600a may output the second media stream 633 and the third media stream 641 by using output modules (e.g., the output module 440 of FIG. 4). For example, as illustrated in reference numeral 603 of FIG. 6B, the first client device 600a may display, on the execution screen of the program, a video stream of the first client device 600a and video streams generated by other client devices (e.g., the second client device 600b and the third client device 600c), and may output audio streams generated by the other client devices via a speaker. The first client device 600a may receive, via the media server 221, only media streams of some client devices among the client devices (e.g., the second client device 600b and the third client device 600c) participating in the conference room. For example, the first client device 600a may select some of the plurality of client devices 600a, 600b, and 600c participating in the conference room on the execution screen of the program, and may receive, based on the selection, only media streams of the selected some client devices. For example, the management server 222 may receive information on the some of the plurality of client devices 600a, 600b, and 600c, which are selected by the first client device 600a, and may transmit the information on the selected some of the plurality of client devices 600a, 600b, and 600c to the media server 221. Based on reception of the information, the media server 221 may transmit media streams for some of the plurality of client devices 600a, 600b, and 600c to the first client device 600a. Other client devices (e.g., the second client device 600b, and the third client device 600c) participating in the conference room may also perform operations similar to the aforementioned operation of the first client device 600a, and duplicate descriptions are thus omitted.

Hereinafter, examples of operations of the client device 210 and the servers 220 (e.g., the media server 221 and the management server 222) according to an embodiment will be described.

According to an embodiment of the disclosure, the media server 221 may classify at least some of multiple client devices having established communication connections to the media server 221 into a group (or may include the same in a group). The media server 221 may determine a master device and a slave device from among the client devices classified into the group, and may receive, from a master device, a merged media stream generated by the master device and identification information for identification (or separation) of multiple sub media streams included in the merged media stream.

Figure 7:
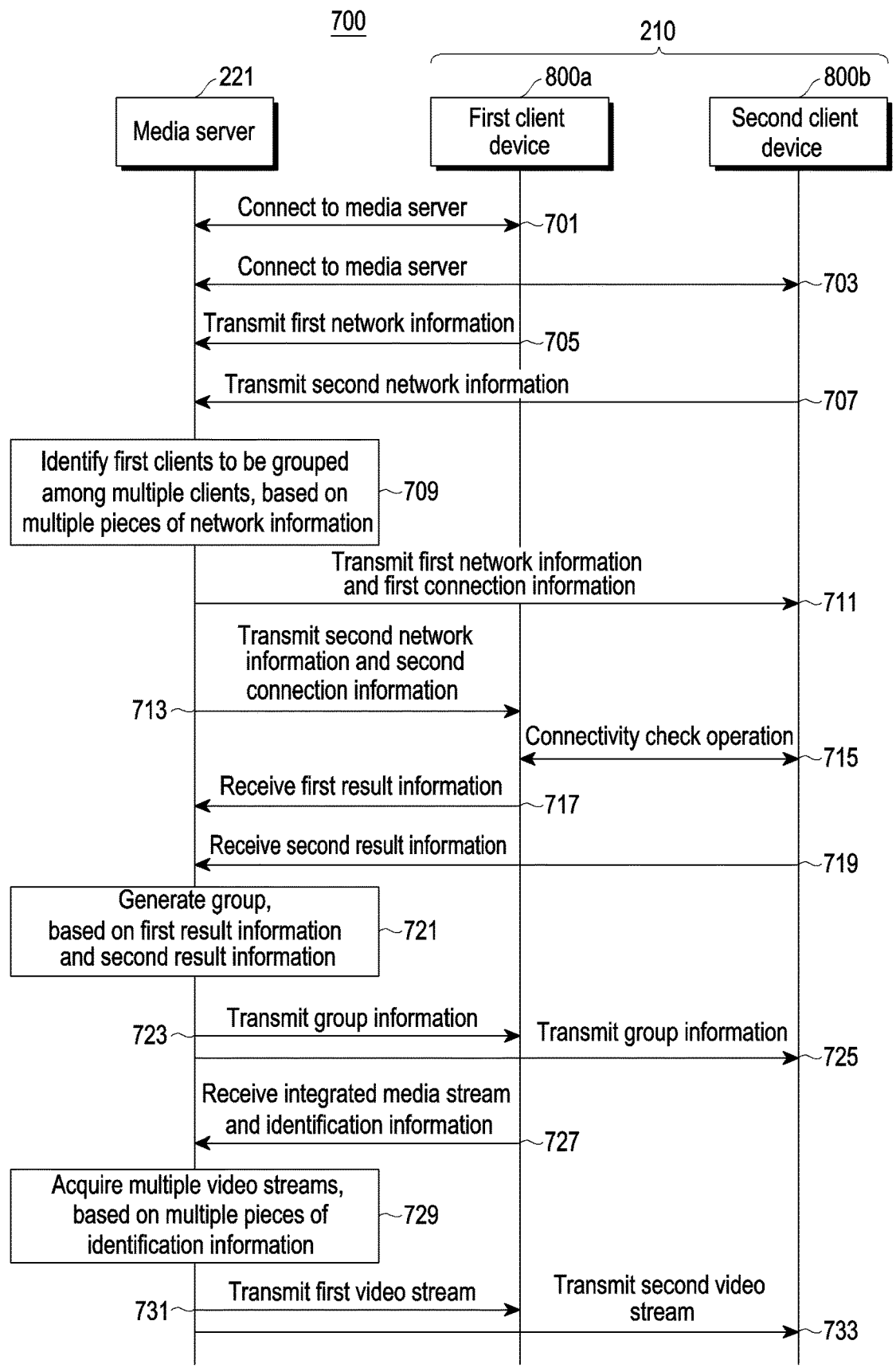
FIG. 7 is a flowchart illustrating operations of client devices and servers (e.g., a media server and a management server) according to an embodiment of the disclosure.

FIG. 7 is a flowchart 700 illustrating operations of a client device and servers (e.g., a media server and a management server) according to an embodiment of the disclosure. The operations illustrated in FIG. 7 are not limited to the illustrated order and may be performed in various orders. According to an embodiment of the disclosure, more operations or at least one fewer operation than those illustrated in FIG. 7 may be performed. Hereinafter, FIG. 7 will be described with reference to FIGS. 8 and 9.

Figure 8A:
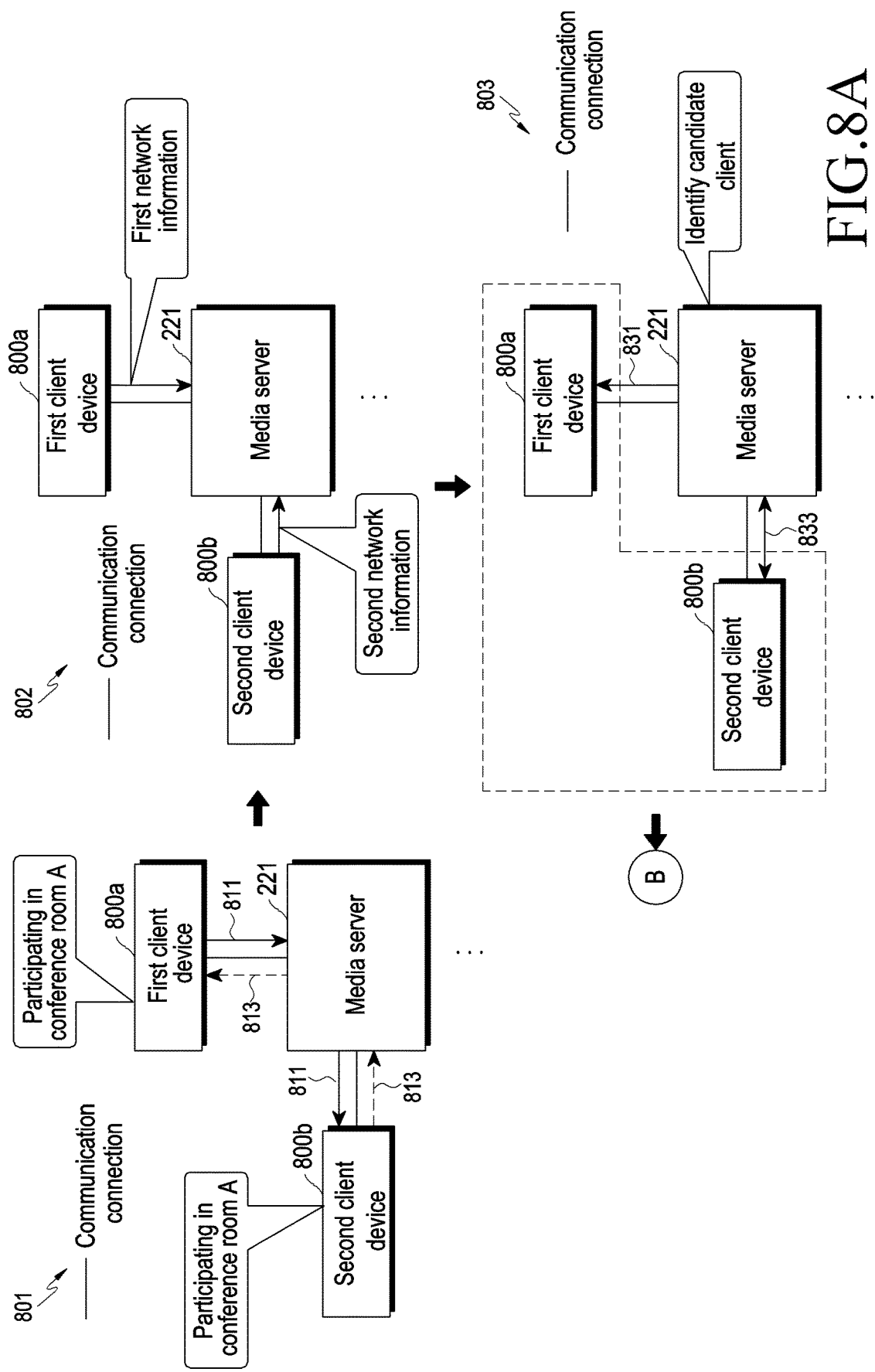
FIG. 8A is a diagram illustrating identifying candidate client devices which are likely to be included in a media server group according to an embodiment of the disclosure.
Figure 8B:
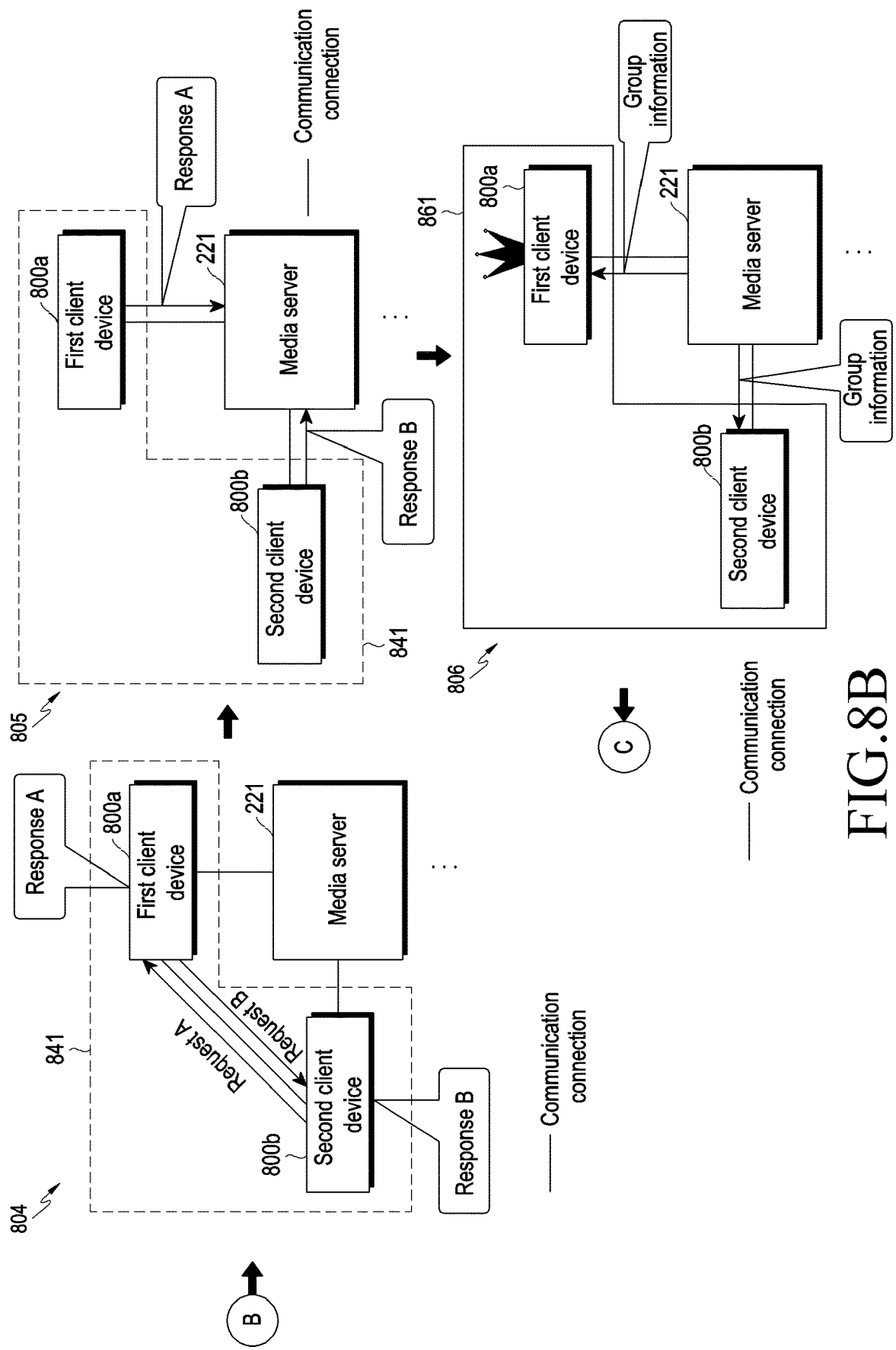
FIG. 8B is a diagram illustrating identifying client devices to be included in a media server group, and identifying a master device and a slave device among the identified client devices according to an embodiment of the disclosure.
Figure 8C:
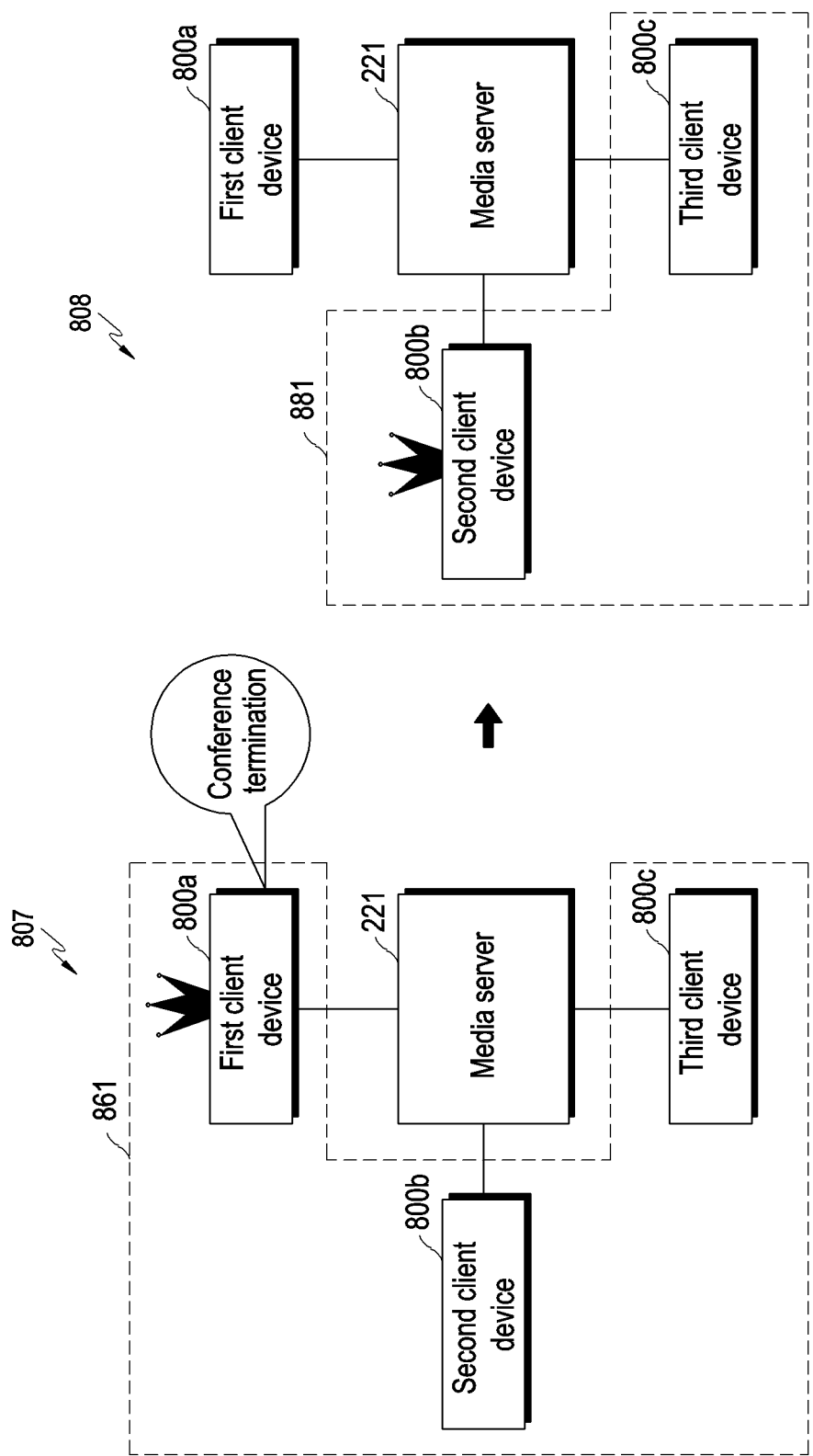
FIG. 8C is a flowchart illustrating regenerating a media server group according to an embodiment of the disclosure.
Figure 9:
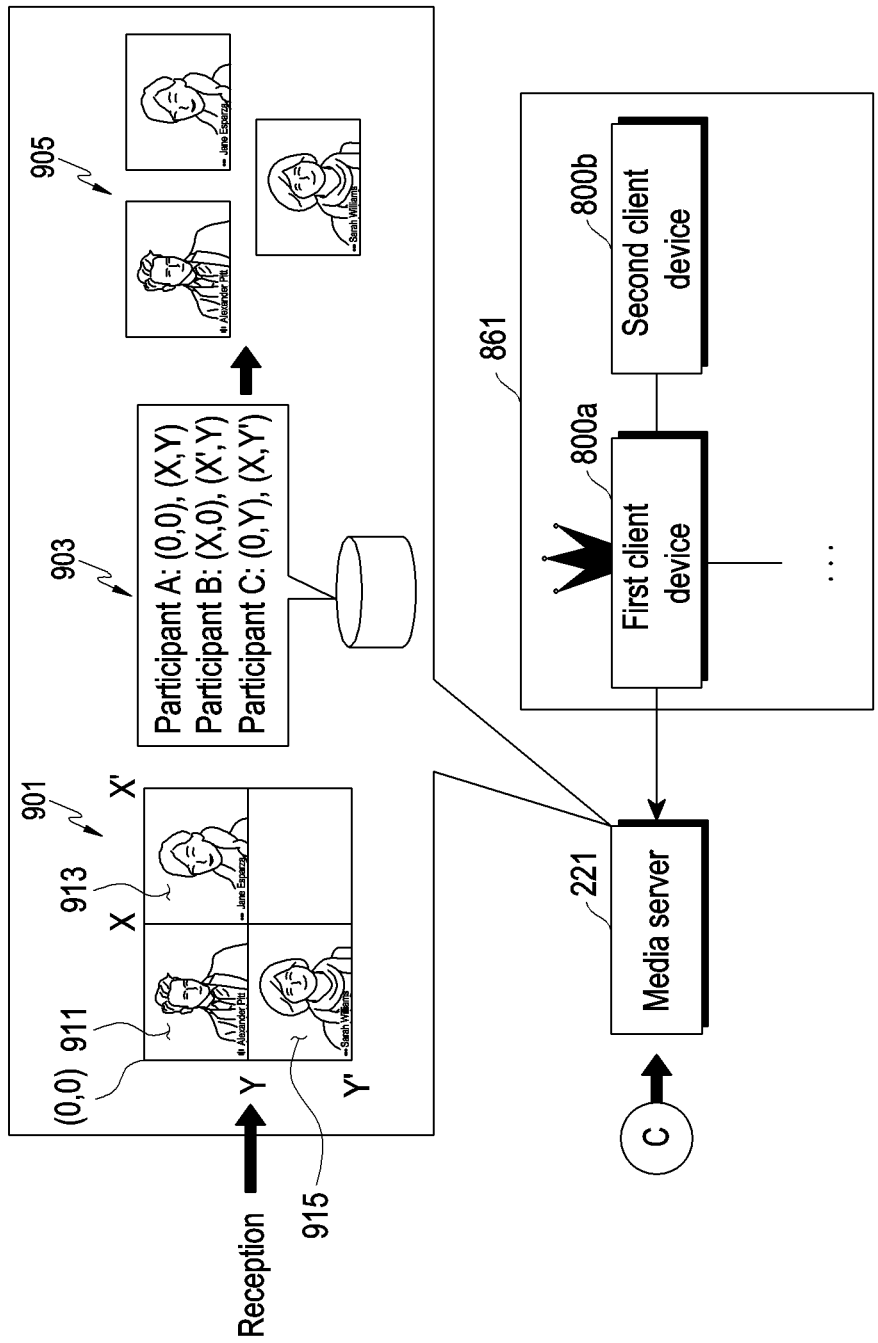
FIG. 9 is a diagram illustrating receiving a merged media stream and identification information on multiple sub media streams from a master device by a media server according to an embodiment of the disclosure.

FIG. 8A is a diagram illustrating identifying candidate client devices which are likely to be included in a group of media server according to an embodiment of the disclosure. FIG. 8B is a diagram illustrating identifying client devices to be included in a group by media server, and identifying a master device and a slave device among the identified client devices according to an embodiment of the disclosure. FIG. 8C is a diagram illustrating regenerating a group by a media server according to an embodiment of the disclosure. FIG. 9 is a diagram illustrating receiving a merged media stream and identification information of multiple sub media streams from a master device by media server according to an embodiment of the disclosure.

Referring to FIGS. 8A, 8B, 8C, and 9, according to an embodiment of the disclosure, the media server 221 may establish a communication connection to a first client device 800a in operation 701, and may establish a communication connection to a second client device 800b in operation 703. For example, as illustrated in reference numeral 801 of FIG. 8A, the media server 221 may establish communication connections to multiple client devices (e.g., the first client device 800a and the second client device 800b) participating in a conference room, and may receive media streams 811 and 813 from the plurality of client devices. Establishment of the communication connections to the plurality of client devices participating in the conference room by the media server 221 is the same as the description provided with reference to FIG. 5, and duplicate descriptions are thus omitted.

According to an embodiment of the disclosure, the media server 221 may receive first network information for the first client device 800a from the first client device 800a in operation 705, and may receive second network information for the second client device 800b from the second client device 800b in operation 707. For example, as illustrated in reference numeral 802 of FIG. 8A, the media server 221 may receive, from each of the plurality of client devices (e.g., the first client device 800a and the second client device 800b) participating in the conference room, network information (e.g., IP address information, cost information, or a port number) for each of the plurality of client devices. Hereinafter, descriptions will be provided for examples of transmitting network information to the media server 221 by the client device 210.

In an embodiment of the disclosure, a client device (e.g., the first client device 800a) participating in the conference room may transmit ICE candidate information as the first network information to the media server 221 by using an ICE framework (or a program for driving the ICE framework (e.g., ICE agent (not illustrated))), based on the group management module 411 described in FIG. 4. The program (e.g., ICE agent) for driving the ICE framework may generate ICE candidate information at a designated period or whenever a communication connection state of the client device is changed. The group management module (the group management module 411 of FIG. 4) may identify ICE candidate information generated by the ICE agent (not illustrated) and may transmit the identified ICE candidate information to the media server 221. The ICE candidate information may include IP address information, such as local host IP address information, internal NAT IP address information, and NAT public IP address information, and/or cost information. As described above in FIG. 3, the cost information may be configured according to a type (e.g., the communication connection scheme using cellular communication or communication scheme using or AP, disclosed in FIG. 2A) of the used communication connection scheme and, for example, a value of the cost information may be configured in proportion to a degree of billing charge for each type of communication scheme. An example of the aforementioned ICE candidate information is described in the following [Example of ICE candidate information]. Other ICE candidate information may be implemented as in a known ICE framework, and detailed descriptions are thus omitted.

[Example of ICE Candidate Information]
ICE candidate (host) information
candidate:1791031112 1 udp 2122260223 10.10.15.25 57339 typ host generation 0 ufrag say/network-id 1 network-cost 10
ICE candidate (srflx, server reflexive) information
candidate:3282008221 1 udp 1686052607 207.114.244.5 61520 typsrflxraddr 10.10.15.25 rport 61520 generation 0 ufrag say/network-id 1 network-cost 10
ICE candidate(relay) information
candidate:3513707144 1 udp 41886207 52.88.206.94 52707 typ relay raddr 207.114.244.5 rport 61520 generation 0 ufrag say/network-id 1 network-cost 10

In addition, in an embodiment of the disclosure, the first client device 800a may transmit designated port number information as the first network information to the media server 221 by using the group management module (the group management module 411 of FIG. 4). For example, the first client device 800a may identify a port number designated for a video conference program (or assign a designated port number to the program) from among multiple ports available in the first client device 800a. Based on the designated port number, the first client device 800a may transfer information (e.g., media streams) received from other external devices (e.g., the media server 221 or another client device (e.g., the second client device 800b)) to the video conference program and may process the received information by using the program. Meanwhile, like the described transmission of the first network information (e.g., the ICE candidate information and the port number) to the media server 221 by the first client device 800a, other client devices (e.g., the second client device 800b) participating in the conference room may also transmit network information (e.g., second network information) to the media server 221 as illustrated in reference numeral 802 of FIG. 8A.

According to an embodiment of the disclosure, in operation 709, the media server 221 may identify multiple candidate client devices to be grouped from among multiple clients, based on multiple pieces of network information. For example, the media server 221 may identify candidate client devices which are likely to be classified into (or to be included in) a group, based on at least some of information included in the network information (e.g., the first network information and the second network information) received from the plurality of client devices (e.g., the first client device 800a and the second client device 800b). For example, the group may be a type of category for classification of multiple client devices. Among multiple client devices having established communication connections to the media server 221 (or participating in a specific conference room), some client devices capable of transmitting and/or receiving media streams between each other may be classified into the designated group (or may be included in the specific group). In an embodiment of the disclosure, the media server 221 may identify candidate client devices (e.g., candidate client devices 841 of FIG. 8B) which are likely to be included in the group, by comparing public IP addresses included in respective pieces of ICE candidate information received from the plurality of client devices. For example, the media server 221 may identify client devices having corresponding (identical) public IP addresses to be the candidate client devices (e.g., the candidate client devices 841 of FIG. 8B). In addition, for example, the media server 221 may identify client devices having corresponding (identical) private IP addresses to be the candidate client devices (e.g., the candidate client devices 841 of FIG. 8B). In addition, classification of the client devices into a group by the media server 221 may be performed as in known art, and detailed descriptions thereof are thus omitted.

According to an embodiment of the disclosure, based on identification of occurrence of a designated event, the media server 221 may initiate identification of candidate client devices to be grouped (or to be included in a group) from among the plurality of client devices (e.g., the first client device 800a and the second client device 800b) participating in the conference room. In an embodiment of the disclosure, the occurrence of the designated event may include that the number of the client devices participating in the conference room corresponds to a designated number (e.g., 2). In addition, in an embodiment of the disclosure, the occurrence of the designated event may include elapse of a designated time after opening the conference room. For example, as illustrated in FIGS. 5 and 6, while establishing communication connections to the plurality of client devices participating in the conference room, and receiving media streams, the media server 221 may initiate identification of the candidate client devices to be grouped (or to be included in the group) in response to the occurrence of the designated event.

According to an embodiment of the disclosure, the media server 221 may transmit, in operation 711, the first network information and first connection information to the second client device 800b identified as a candidate client device, and may transmit, in operation 713, the second network information and second connection information to the first client device 800a identified as the candidate client device. For example, according to a result of performing operation 709, the media server 221 may identify the first client device 800a and the second client device 800b to be the candidate client device 841 likely to be included in the group, as illustrated in reference numeral 804 of FIG. 8B. The media server 221 may transmit (e.g., reference numerals 831 and 833) network information for other candidate client devices and connection codes (group candidate information) associated with the respective candidate client devices 841 to the identified candidate client devices 841 (e.g., the first client device 800a and the second client device 800b), respectively, so that the identified client devices 841 perform a connectivity check operation. The connection code may include a request code and a response code. For example, the connection code transmitted from the media server 221 to one candidate client device may include a request code to be transmitted by one candidate client device to another candidate client device, a request code to be received from another candidate client device, and a response code to be transmitted to another candidate client device in response to a request code received from the another candidate client device. The request code may be a code transmitted by the one candidate client device to another client device, and the response code may be a code transmitted by the one candidate client device in response to a request code received from another client device. Connection codes transmitted to the respective candidate client devices may be different from each other.

According to an embodiment of the disclosure, the candidate client devices (e.g., the first client device 800a and the second client device 800b) may perform a connectivity check operation in operation 715. For example, the candidate client devices (e.g., the first client device 800a and the second client device 800b) may perform the connectivity check operation based on the network information and connection codes received from the media server 221. The connectivity check operation may include, based on the network information, transmitting a request code to the another candidate client device by the one candidate client device, and receiving a response code or an error code from the another candidate client device in response to transmission of the request code. For example, as illustrated in reference numeral 804 of FIG. 8B, the first client device 800*a* may establish a communication connection to the second client device 800*b*, based on the network information of the second client device 800*b*, and may transmit a first request code (e.g., request B) to an IP address and a port of the second client device 800*b*. In response to reception of the first request code (e.g., request B), the second client device 800*b* may compare the first request code (e.g., request B) with a second request code received from the media server 221, the second request code being received from the first client device 800*a*. If the first request code (e.g., request B) and the second request code correspond (e.g., identical) to each other, the second client device 800*b* may transmit a first response code (e.g., response B) to the first client device 800*a*. Alternatively, if the first request code (e.g., request B) and the second request code do not correspond to each other, the second client device 800*b* may transmit an error code to the first client device 800*a*. The first client device 800*a* may transmit the received first response code or the error code to the media server 221. Similarly, as illustrated in reference numeral 804 of FIG. 8B, the second client device 800*b* may establish a communication connection to the first client device 800*a*, based on the network information of the first client device 800*a*, and in response to transmission of a third request code (e.g., request A) to an IP address and a port of the first client device 800*a*, the second client device 800*b* may receive a second response code (e.g., response A) or an error code from the first client device 800*a* so as to transmit the same to the media server 221.

According to an embodiment of the disclosure, the media server 221 may receive first result information in operation 717, may receive second result information in operation 719, and may generate a group based on the first result information and the second result information in operation 721. For example, as described above, as illustrated in reference numeral 805 of FIG. 8B, according to results of performing the connectivity check operation by the candidate client devices 841 (e.g., the first client device 800*a* and the second client device 800*b*), the media server 221 may receive codes (e.g., the first response code (e.g., response B), the second response code (response A), or an error code) from the candidate client devices 841. The media server 221 may determine, based on the received codes, whether to classify the candidate client devices into a group (or include the same in a group). For example, the media server 221 may compare a first code (e.g., the first response code (e.g., response B) or an error code) received from the first client device 800*a* with a response code (the first response code (e.g., response B)) provided to the first client device 800*a*, and may compare a second code (e.g., the second response code (e.g., response A) or an error code) received from the second client device 800*b* with a response code (e.g., the second response code (e.g., response A)) provided to the second client device 800*b*. As results of the comparisons, if it is identified that the first code corresponds to the response code provided to the first client device 800*a*, and the second code corresponds to the second response code provided to the second client device 800*b*, the media server 221 may identify that the two devices are connectable (or have connectivity), and as illustrated in reference numeral 806 of FIG. 8B, the media server 221 may generate a group 861 and add the first client device 800*a* and the second client device 800*b* to the group. Alternatively, as results of the comparisons, if it is identified that the first code does not correspond to the response code provided to the first client device 800*a*, or the second code does not correspond to the second response code provided to the second client device 800*b*, the media server 221 may not generate the group (e.g., the group 861 of FIG. 8B). In this case, as described in FIGS. 5 and 6, the media server 221 may receive media streams from multiple client devices (e.g., the first client device 800*a* and the second client device 800*b*), and may transmit media streams to the plurality of client devices, respectively.

The connectivity check operation is not limited to the description above, and may be performed by three or more client devices. According to performing of the connectivity check operation by respective three or more client devices, the media server 221 may receive response codes from the three or more client devices, respectively. For example, if the three or more client devices include a first client device, a second client device, and a third client device, the media server may receive codes based on performing of the connectivity check operations by the respective client devices, according to performing of each of a first connectivity check operation between the first client device and the second client device, a second connectivity check operation between the second client device and the third client device, and a third connectivity check operation between the first client device and the third client device. The media server 221 may identify whether the received codes correspond to the codes provided to the respective client devices, and may add, to the group, only devices identified to be connectable. In an embodiment of the disclosure, if all the respective client devices are identified to be connectable to each other, the media server 221 may add all three or more client devices to the group. In another embodiment of the disclosure, if it is identified that only some client devices are mutually connectable, and only some other client devices are mutually connectable, the media server 221 may generate different groups so as to add some client devices to one group and add some other client devices to another group. For example, some of multiple client devices participating in the conference room may be included in one group, and some others may be included in another group.

According to an embodiment of the disclosure, as illustrated in reference numeral 806 of FIG. 8B, the media server 221 may determine a master (or leader) device and a slave device from among the client devices (e.g., the first client device 800*a* and the second client device 800*b*) included in the group (e.g., the group 861 of FIG. 8B). The master device of the group (e.g., the group 861) may be configured to receive media streams from other slave devices of the group, and the slave devices may be configured to transmit media streams to the master device. For example, the media server 221 may determine the master device and the slave device, based on information associated with a processing capability of the client devices. The processing capability may include capability to process a media stream or capability to transmit/receive data to/from the media server 221. For example, based on the plurality of client devices (e.g., the first client device 800*a* and the second client device 800*b*) being included in the group (e.g., the group 861), the media server 221 may request information associated with the processing capability from the plurality of client devices included in the group (e.g., the group 861), and receive the information associated with the processing capability so as to identify the master device and the slave device. As another example, the media server 221 may request and receive the information associated with the processing capability in advance from the plurality of client devices (e.g., the first client device 800a and the second client device 800b) connected to the media server 221 so as to store the same, and if the designated client devices (e.g., the first client device 800a and the second client device 800b) are included in the group 861, the media server 221 may identify the master device and the slave device from the information by referring to information on the designated client devices. Hereinafter, descriptions will be provided for embodiments of determining a master device and a slave device by receiving information associated with the processing capability.

In an embodiment of the disclosure, the media server 221 may identify, as information associated with the processing capability, information on types of the plurality of client devices (e.g., the first client device 800a and the second client device 800b) included in the group 861, and may identify the master device and the slave device. For example, the media server 221 may store, in advance, a degree of capability for processing a media stream for each device type (e.g., the priority in Table 1 below). The priority is determined according to hardware (e.g., a GPU or an encoder/decoder) included in a device, and as a priority has a lower value, a higher processing capability may be configured as described in Table 1. Alternatively, without being limited to the description above, a higher value of priority may be configured for a higher processing capability. For example, the media server 221 may receive, from the plurality of client devices (e.g., the first client device 800a and the second client device 800b), identification information (e.g., device IDs or manufacturer information) of the plurality of client devices, and may identify, based on the identification information, device types of the plurality of client devices so as to identify priorities corresponding to the identified device types. The media server 221 may determine, as a master device, a client device (e.g., the first client device 800a) having a lowest priority from among the identified priorities, and may determine the remaining client device (e.g., the second client device 800b) as a slave device.

TABLE 1

| Priority | Device Types |
| --- | --- |
| 1 | PC including graphic processing unit (GPU) |
| 2 | PC including no graphic processing unit (GPU) |
| 3 | Mobile including hardware encoder and/or decoder |
| 4 | Mobile including no hardware encoder and/or no decoder |

In another embodiment of the disclosure, the media server 221 may identify, as information associated with the processing capability, information on bandwidths between the media server 221 and the plurality of client devices (e.g., the first client device 800a and the second client device 800b), and may identify the master device and the slave device. The media server 221 may predict and/or calculate bandwidths between the plurality of client devices included in the group 861, may determine, as a master device, a client device having a largest calculated bandwidth, and may determine the remaining client devices as slave devices. Prediction of the bandwidths can be implemented by existing an known art, such as an algorithm for calculating a ratio between transmitted packets and received packets (e.g., if a ratio of received packets is high, a bandwidth is calculated to be high), and detailed descriptions are thus omitted.

In another embodiment of the disclosure, the media server 221 may identify cost information as information associated with the processing capability, and identify the master device and the slave device. For example, the media server 221 may determine, as a master device, a device with lowest cost information, and determine the remaining client devices as slave devices. As described above, the cost information may be determined according to a billing charge scheme for a communication type.

The described embodiments may be executed independently or in a combined manner. As an example of execution in a combined manner, the media server 221 may determine a client device, which has been determined to be a master device the largest number of times, as a master device according to execution of operations as in respective embodiments.

Identification of the master device and the slave devices is not limited to the description, and may be performed by a subject (e.g., client devices (e.g., the first client device 800a and the second client device 800b)) other than the media server 221. For example, multiple client devices included in a group may exchange (e.g., transmit and/or receive) information associated with the processing capability described above, and it may be identified that a device designated based on the exchanged information is a master device, and the remaining devices are slave devices. In this case, the media server 221 may refrain from (or may not perform) transmission of group information including information indicating the master device and information indicating the slave devices to the client devices, which will be described later.

According to an embodiment of the disclosure, the media server 221 may perform execution again (or perform identification on candidate client devices again) on the client devices (e.g., the first client device 800a and the second client device 800b) included in a group (e.g., the group 861) when the group (e.g., the group 861) is generated (or after the group is generated). In an embodiment of the disclosure, a state change of at least some of the client devices (e.g., the first client device 800a and the second client device 800b) may include conference termination of the maser device (e.g., the first client device 800a), as illustrated in FIG. 8C. For example, the master device (e.g., the first client device 800a) may notify of termination of a conference to the servers 220 (e.g., the media server 221 and/or the management server 222) as illustrated in reference numeral 807 of FIG. 8C, based on reception of an input (e.g., an input of selecting an icon for termination of the conference) for termination of the conference on an execution screen of a program for a video conference. As illustrated in reference numeral 808 of FIG. 8C, the media server 221 may, in response to the termination of the conference of the master device, perform aforementioned operations 705 to 725 again with respect to the remaining devices (e.g., the second client device 800b and the third client device 800c) included in the group so as to generate a new group (e.g., a group 881), and may configure a master device (e.g., the second client device 800b) and a slave device (e.g., the third client device 800c) for the new group (e.g., the group 881). In another embodiment of the disclosure, the state change of at least some of the client devices (e.g., the first client device 800a and the second client device 800b) may include a change in a communication connection state of the master device (e.g., disconnection of the communication connection, or degrading of a bandwidth between the master device and the media server by a designated value or larger). In addition, in an embodiment of the disclosure, the state change of at least some of the client devices (e.g., the first client device 800a and the second client device 800b) may include participation of a new candidate client device, which is likely to be included in the current group, in the conference room.

According to an embodiment of the disclosure, the media server 221 may transmit group information to a first client device in operation 723, and may transmit group information to a second client device in operation 725. The group information may include information associated with the generated group. In an embodiment of the disclosure, the media server 221 may transmit different group information to the master device (e.g., the first client device 800a) and the slave device (e.g., the second client device 800b). For example, the media server 221 may provide the master device with identification information (e.g., an ID and a code) of a group, network information (e.g., IP address information or port number information) of multiple slave devices included in the group, and/or information on a type of media stream to be received. For example, the media server 221 may provide the slave device with identification information (e.g., an ID and a code) of the group, network information (e.g., IP address information or port number information) of the master device included in the group, and/or information on a type (e.g., video, audio, or graphics) of media stream to be received. In addition, in an embodiment of the disclosure, group information transmitted to the master device and the slave device may be configured to be the same. For example, the group information may include identification information (e.g., an ID or a code) of the group, network information (e.g., IP address information or port number information) of multiple client devices (e.g., the first client device 800a and the second client device 800b) included in the group, information (e.g., identification information of the master device) for identification of the master device of the group, and/or information (e.g., identification information of the slave device) for identification of the slave device of the group. As illustrated in reference numeral 806 of FIG. 8B, the media server 221 may transmit the group information to each of the plurality of client devices (e.g., the first client device 800a and the second client device 800b). Although described later, each of the plurality of client devices may exchange media streams, based on the received group information.

According to an embodiment of the disclosure, the media server 221 may receive, in operation 727, an integrated video stream and multiple pieces of identification information from a client device (e.g., the first client device 800a) identified as the master device, acquire multiple video streams based on the plurality of pieces of identification information in operation 729, transmit a first video stream to the first client device 800a in operation 731, and transmit a second video stream to the second client device 800b in operation 733. For example, as illustrated in FIG. 9, the media server 221 may receive, from a client device (e.g., the first client device 800a) configured to be a master (or leader) device of a group, a single video stream 901 including a sub video stream for each of multiple areas 911, 913, and 915, and identification information 903 for identification (or separation) of the sub video stream for each of the plurality of areas. Although described later, the sub video stream displayed in each of the plurality of areas 911, 913, and 915 may be based on a video stream generated (or acquired) from each of multiple client devices (e.g., the first client device 800a and the second client device 800b) included in a group (e.g., the group 861 of FIG. 8B or 8C). For example, the master device (e.g., the first client device 800a) may convert (e.g., resolution conversion) video streams received from other slave devices (e.g., the second client device 800b) and the video stream generated by the master device into sub video streams, and arrange the converted sub video streams for the respective areas 911, 913, and 915, so as to generate (or acquire) the single merged video stream 901. The master device (e.g., the first client device 800a) may generate (or acquire) the identification information 903 for identification of client devices corresponding to the sub video streams arranged for the respective areas. Generating of the single merged video stream and the plurality of pieces of identification information 903 by the master device will be described later with reference to FIGS. 10 to 12. The media server 221 may separate (or identify) multiple sub video streams from the single video stream 901, based on the received identification information 903 as illustrated in reference numeral 905 of FIG. 9, and may acquire multiple video streams associated with the plurality of client devices (e.g., acquired from the plurality of client devices) by converting (e.g., resolution conversion) the separated multiple sub video streams. Acquiring of the plurality of video streams by the media server 221, based on the single video stream and the plurality of pieces of identification information will be described later with reference to FIGS. 15 and 16. The media server 221 may transmit at least some of the acquired multiple video streams to at least some of the plurality of client devices (e.g., the first client device 800a and the second client device 800b). For example, the media server 221 may provide a video stream requested for each of the plurality of client devices. For example, the first client device 800a may request a video stream for the second client device 800b from the media server 221. The media server 221 may identify a video stream corresponding to the second client device 800b, and transmit the identified video stream to the first client device 800a. In this case, the media server 221 may transmit a media stream to the client device 210, the media stream including time-synchronized video and audio streams obtained by synchronization of a time of the video stream to be transmitted and a time of an audio stream received by the media server 221.

Hereinafter, an example of an operation of the client device 210 according to an embodiment will be described.

According to an embodiment of the disclosure, at least one client device 210 configured to be a slave device of a group may transmit a video stream to the client device 210 configured to be a master device of the group. The client device 210 configured to be the master device of the group may generate, based on multiple video streams received from other slave devices, a single video stream and multiple pieces of identification information for identification of multiple sub video streams included in the single video stream, and may transmit the generated single video stream and multiple pieces of identification information to the media server 221.

Figure 10:
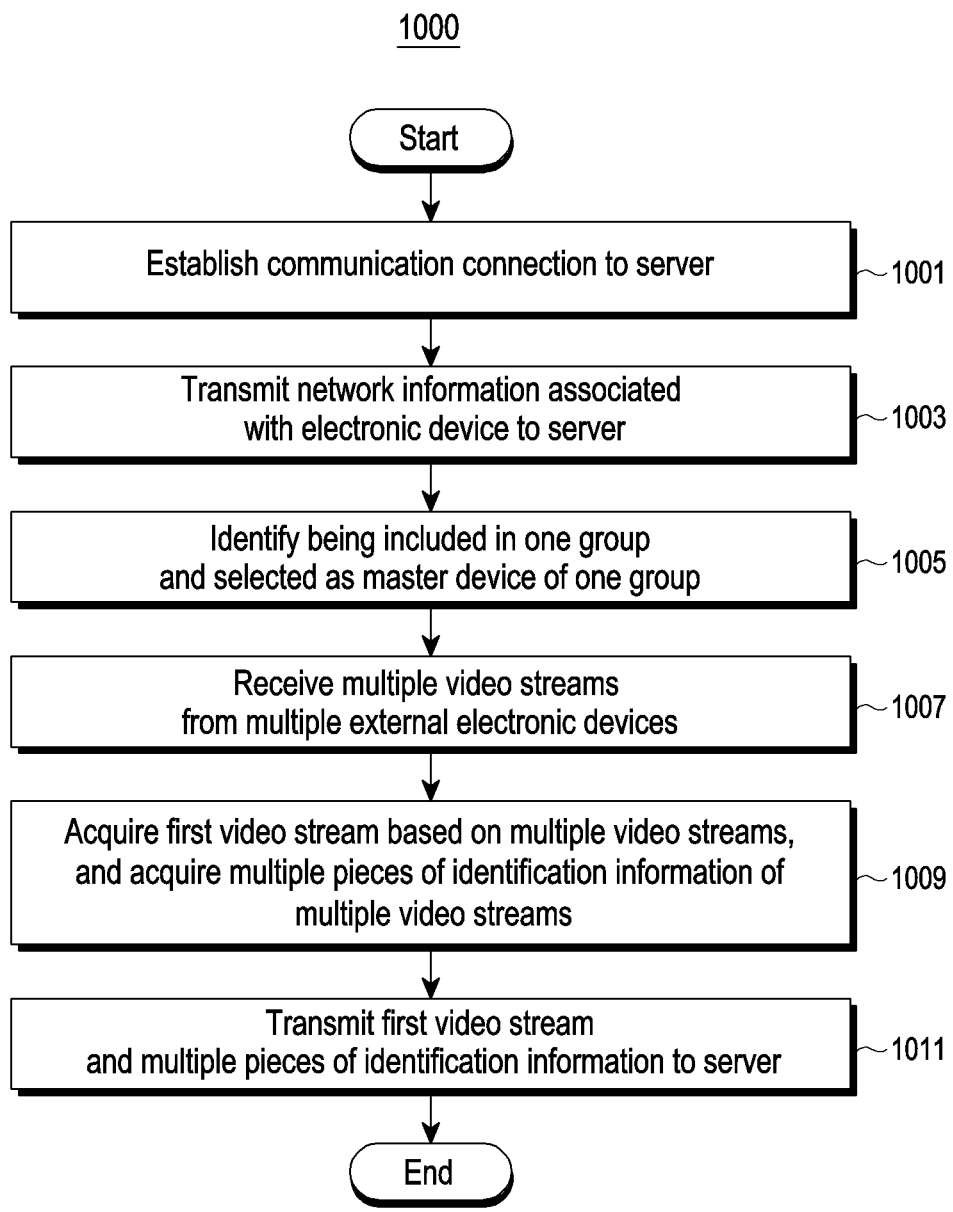
FIG. 10 is a flowchart illustrating an operation of a client device according to an embodiment of the disclosure.

FIG. 10 is a flowchart 1000 illustrating an operation of a client device according to an embodiment of the disclosure. The operations illustrated in FIG. 10 are not limited to the illustrated order and may be performed in various orders. According to an embodiment of the disclosure, more operations or at least one fewer operation than those illustrated in FIG. 10 may be performed. Hereinafter, FIG. 10 will be described with reference to FIGS. 11 and 12.

Figure 11:
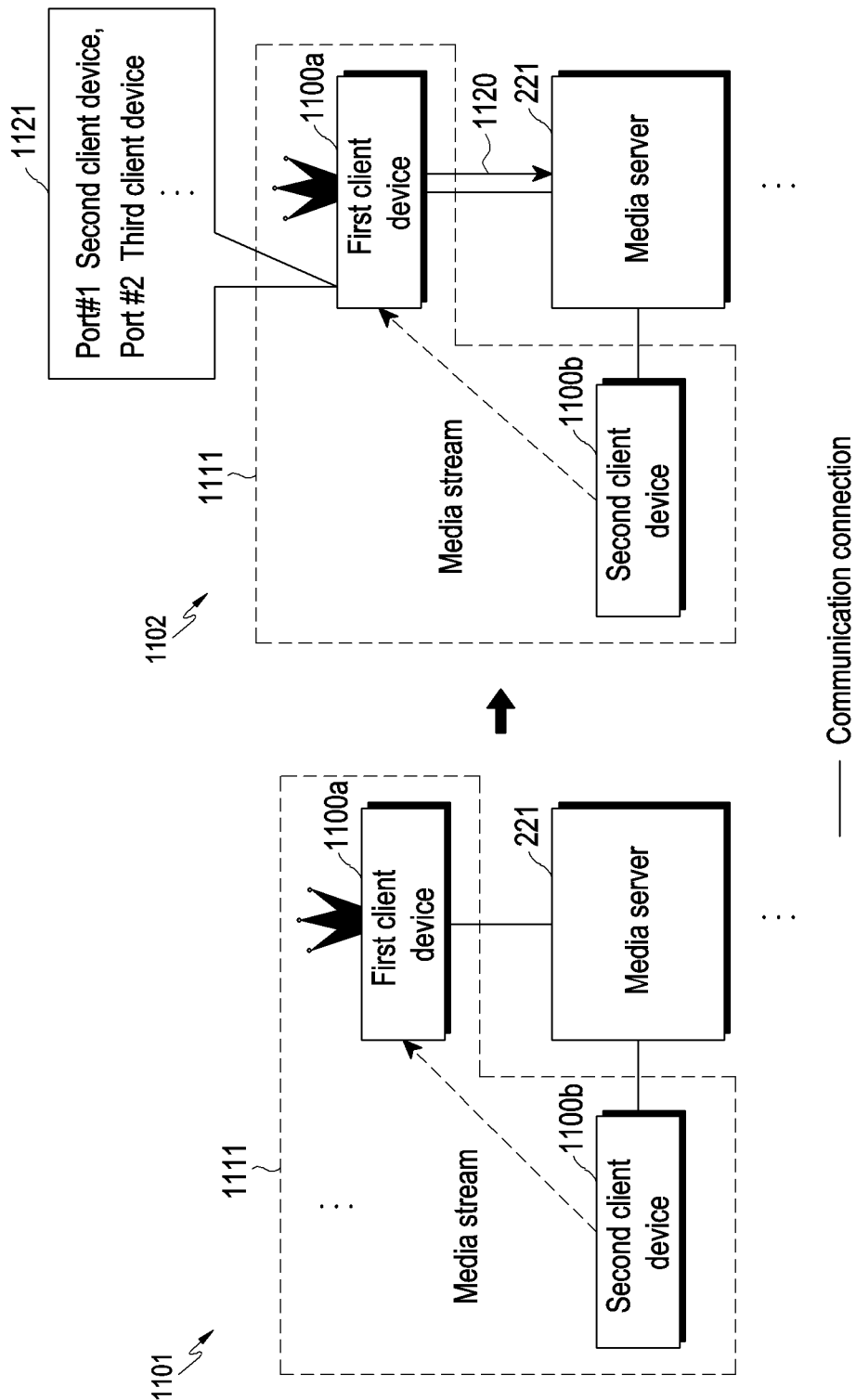
FIG. 11 is a diagram illustrating operations of a master device and at least one slave device in a group according to an embodiment of the disclosure.
Figure 12:
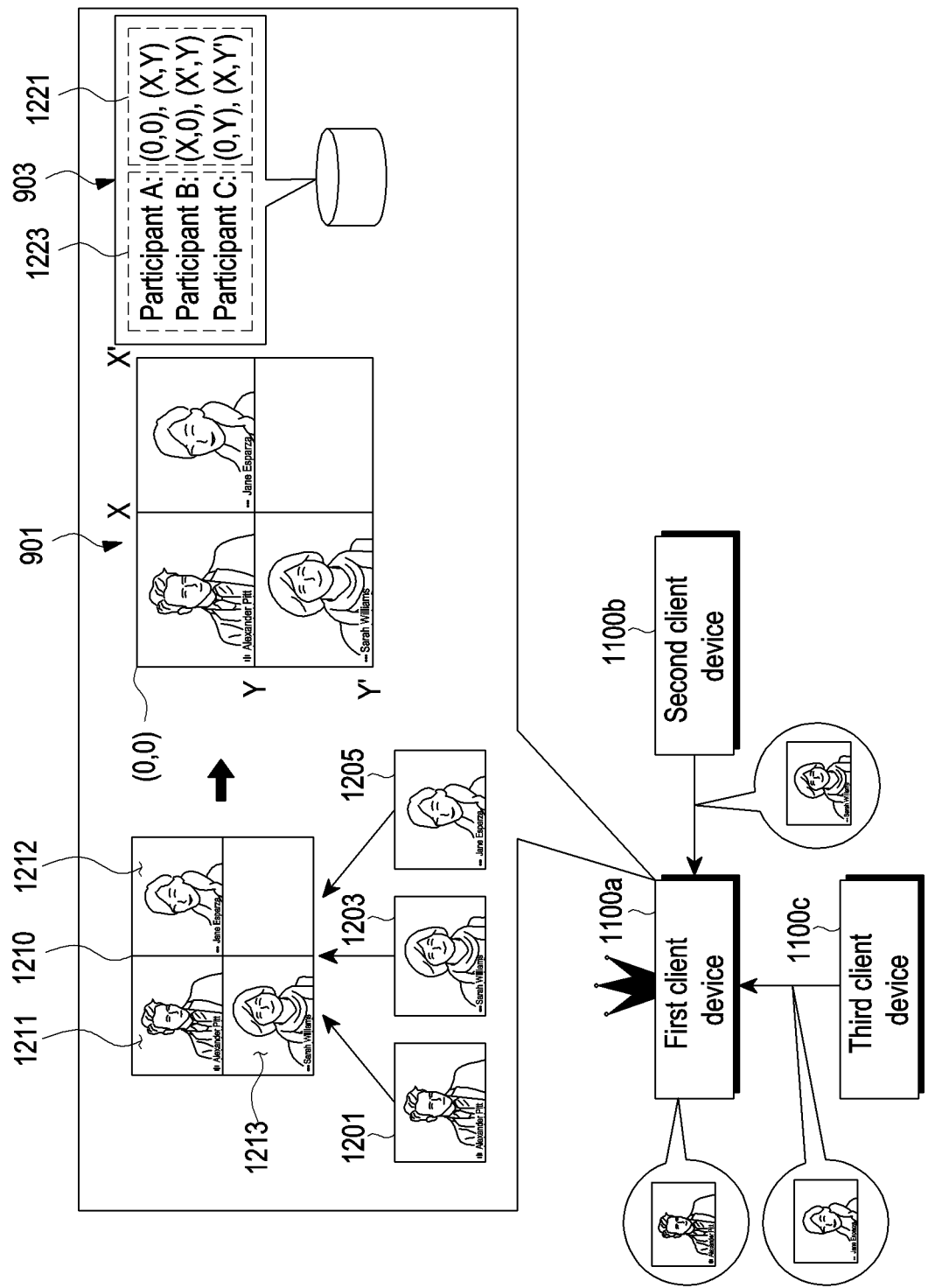
FIG. 12 is a diagram illustrating generating a single video stream of a master device in a group according to an embodiment of the disclosure.

FIG. 11 is a diagram illustrating operations of a master device and at least one slave device in a group according to an embodiment of the disclosure. FIG. 12 is a diagram illustrating generating a single video stream of a master device in a group according to an embodiment of the disclosure.

Referring to FIGS. 10, 11, and 12, according to an embodiment of the disclosure, an electronic device (e.g., the first client device 1100a) may establish a communication connection to the media server 221 in operation 1001, and may transmit network information associated with the client device 210 to the media server 221 in operation 1003. For example, the client device 210 (e.g., the first client device 1100a or the second client device 1100b) may participate in a conference room, and may establish a communication connection to the media server 221 assigned to the conference room, based on information (e.g., information for communication connection establishment to the media server 221) on the media server 221, which is received from the management server 222. Establishment of the communication connection to the media server 221 by the client device 210 is the same as the description provided with reference to FIG. 5, and duplicate descriptions are thus omitted. The client device 210 may transmit network information (e.g., ICE candidate information and/or a port number), based on the establishment of the communication connection to the media server 221. Transmission of the network information by the client device 210 is the same as the descriptions provided with reference to operations 705 and 707 of FIG. 7, and duplicate descriptions are thus omitted.

According to an embodiment of the disclosure, the electronic device (e.g., the first client device 1100a) may identify, in operation 1005, that the electronic device is included in a group and is selected as a master device of the group. For example, the client device 210 (e.g., the first client device 1100a or the second client device 1100b) may perform, based on network information and a connection code for another client device 210, which are received from the media server 221, a connectivity check with respect to another client device 210 and may transmit a response code received from another client device 210 to the media server 221. The client device 210 may receive group information from the media server 221, based on transmission of the response code. The connectivity check by the client device 210 and transmission of the group information by the media server 221 are the same as the descriptions provided with reference to operations 711 to 725 of FIG. 7, and duplicate descriptions are thus omitted. The group information transmitted to the client device 210 may include information indicating that the client device 210 is a master device in a group and network information of other slave devices in the group. As illustrated in reference numeral 1101 of FIG. 11, it may be identified that, based on information in the group information, which indicates that the client device is a master device, the client device (e.g., the first client device 1100a) is included in a group 1111 and is configured to be the master device in the group 1111. As illustrated in reference numeral 1101 of FIG. 11, it may be identified that, based on information in the group information, which indicates that another client device (e.g., the second client device 1100b) is a slave device, the another client device is included in the group 1111 and is configured to be the slave device in the group 1111.

According to an embodiment of the disclosure, in operation 1007, the electronic device (e.g., the first client device 1100a) may receive multiple video streams from multiple external devices. For example, as illustrated in reference numeral 1101 of FIG. 11, the slave device (e.g., the second client device 1100b) in the group may transmit a media stream (e.g., a video stream, an audio stream, and/or graphics) to the master device (e.g., the first client device 1100a). The slave device (e.g., the second client device 1100b) may identify the client device 210 (e.g., the first client device 1100a) configured to be the master device, based on information indicating the master device, which is included in the group information received from the media server 221. The slave device (e.g., the second client device 1100b) may establish a communication connection to the master device, based on network information for the first client device 1100a, which is included in the group information, and may transmit a media stream generated by the slave device to an IP address and a port number of the first client device 1100a, as illustrated in reference numeral 1101 of FIG. 11. Without being limited to the description provided in reference numeral 1101 of FIG. 11, the group may include at least two slaves, and the at least two slave devices may transmit media streams to the master device as described above. The master device (e.g., the first client device 1100a) may receive media streams from slave devices in the group via multiple ports used by the slave devices.

According to an embodiment of the disclosure, the master device (e.g., the first client device 1100a) in the group may transmit image quality information associated with the group (e.g., the group 1111) (or used by the client devices in the group) to the slave devices (e.g., the second client device 1100b) in the group, and may transmit a request for the slave devices (e.g., the second client device 1100b) to generate video streams based on the image quality information so as to transmit the generated video streams. For example, the image quality may include at least one of a frame rate, a resolution, and a bit rate. The image quality is not limited to the description above, and may include various types of image quality, such as color, luminance, contrast, sharpness, gamma, or a three-dimensional (3D) lookup table (3DLUT) for an image. In an embodiment of the disclosure, the master device (e.g., the first client device 1100a) may identify and/or configure a frame rate associated with the group, based on frame rates available by the client devices in the group (e.g., the group 1111). For example, the master device (e.g., the first client device 1100a) may request frame rate information from the media server 221 or other client devices in the group (e.g., the group 1111) so as to receive information on frame rates used by respective slave devices from the media server 221 or the slave devices (e.g., the second client device 1100b) in the group (e.g., the group 1111). The master device (e.g., the first client device 1100a) may configure a lowest frame rate among multiple frame rates used by the master device and the slave devices (e.g., the second client device 1100b) to be a frame rate (i.e., a target frame rate) associated with the group (e.g., the group 1111). In this case, if the lowest frame rate is lower than a designated frame rate, the media server 221 may configure the target frame rate to be the designated frame rate. In this case, the master device (e.g., the first client device 1100a) may also configure a lower limit of the frame rate associated with the group (e.g., the group 1111) to be a designated value (e.g., 15 fps). The lowest frame rate is not limited to the description above and may be adjusted. The slave device (e.g., the second client device 1100b) may receive the information on the frame rate associated with the group (e.g., the group 1111) from the master device (e.g., the first client device 1100a), and may generate a video stream having the configured frame rate so as to transmit the video stream to the master device. In addition, in an embodiment of the disclosure, the master device (e.g., the first client device 1100a) may configure a resolution and a bit rate associated with the group (e.g., the group 1111), based on a bandwidth between the media server 221 and the master device. Configuration if the resolution and the bit rate based on the bandwidth between the media server 221 and the master device (e.g., the first client device 1100a) will be described later with reference to FIGS. 13 and 14. The slave device (e.g., the second client device 1100b) may receive information on the resolution and bit rate associated with the group (e.g., the group 1111) from the master device (e.g., the first client device 1100*a*), and may generate a video stream having the configured resolution and bit rate so as to transmit the video stream to the master device.

Without being limited to the description above, the master device (e.g., the first client device 1100*a*) may not transmit information on the image quality associated with the group (e.g., the group 1111) (or used by the client devices in the group (e.g., the group 1111)) to the slave devices (e.g., the second client device 1100*b*). The master device (e.g., the first client device 1100*a*) may convert the image quality of video streams received from the slave devices (e.g., the second client device 1100*b*), based on the information on the image quality, and may generate (e.g., a part of operation 1009) a single video stream, based on video streams having the converted image quality.

According to an embodiment of the disclosure, in operation 1009, the electronic device (e.g., the first client device 1100*a*) may acquire a first video stream, based on multiple video streams, and may acquire multiple pieces of identification information of the plurality of video streams. For example, the master device (e.g., the first client device 1100*a*) may merge a video stream of the master device and multiple video streams received from the slave devices (e.g., the second client device 1100*b*) so as to generate the merged single video stream 901, and may generate the plurality of pieces of identification information 903 (e.g., area identification information 1221 for each of multiple areas and device identification information 1223 for each of multiple areas) for identification of the client device 210 corresponding to the video stream (hereinafter, sub video stream) for each of areas (e.g., areas 1211, 1212, and 1213) included in the generated single video stream 901. Hereinafter, descriptions will be provided respectively for generating of the single video stream 901 and generating of the plurality of pieces of identification information 903 by master device (e.g., the first client device 1100*a*).

Hereinafter, generating of the single video stream 901 by master device (e.g., the first client device 1100*a*) will be first described.

According to an embodiment of the disclosure, the master device (e.g., the first client device 1100*a*) may acquire multiple video streams (e.g., video streams 1201, 1203, and 1205 of FIG. 12) from multiple media streams received from other slave devices (e.g., the second client device 1100*b*), and a video stream may be acquired using a camera by the master device. The master device (e.g., the first client device 1100*a*) may generate the single video stream 901 by merging the acquired multiple video streams. In an embodiment of the disclosure, the master device may generate the single video stream 901, based on a predesignated layout 1210. For example, the predesignated layout 1210 may include the plurality of areas 1211, 1212, and 1213 having designated visual attributes, as illustrated in FIG. 12. The visual attributes may include a size and a shape. As illustrated, the plurality of areas 1211, 1212, and 1213 may be configured to have sizes and shapes corresponding to each other (e.g., the same sizes and shapes), or may be configured to have different sizes and shapes, without being limited to the description. The number of the plurality of areas 1211, 1212, and 1213 may be configured to correspond to the number of the client devices 210 participating in a group (or a conference room) (e.g., equal to the number of the client devices 210, or more than the number of the client devices 210 by a specified number). The master device (e.g., the first client device 1100*a*) may perform resizing for sizes and shapes of the plurality of video streams according to the sizes and/or shapes of the respective multiple areas 1211, 1212, and 1213, and may generate the single video stream 901 by arranging the resized multiple video streams 1201, 1203, and 1205 according to the respective multiple areas 1211, 1212, and 1213. In addition, the master device (e.g., the first client device 1100*a*) may crop the plurality of video streams 1201, 1203, and 1205 according to the sizes and/or shapes of the respective multiple areas 1211, 1212, and 1213, and may arrange the cropped multiple video streams according to the plurality of areas 1211, 1212, and 1213. The master device (e.g., the first client device 1100*a*) may arrange the plurality of video streams 1201, 1203, and 1205 in a predetermined order. For example, the master device (e.g., the first client device 1100*a*) may arrange the video streams 1201, 1203, and 1205, which are resized for each client device 210, in the areas 1211, 1212, and 1213 in one direction (e.g., clockwise) in the order of participation in the conference. The master device (e.g., the first client device 1100*a*) may encode the generated single video stream 901 by using an encoder (not illustrated).

Hereinafter, generating of the plurality of pieces of identification information 903 by master device (e.g., the first client device 1100*a*) will be described.

The master device (e.g., the first client device 1100*a*) may acquire identification information (area identification information) 1221 for identification of each of the plurality of areas 1211, 1212, and 1213 included in the single video stream 901 and identification information (e.g., IDs, codes, or identifiers) (device identification information) 1223 of the client devices corresponding to the respective multiple areas 1211, 1212, and 1213. In an embodiment of the disclosure, the master device (e.g., the first client device 1100*a*) may acquire information for identification of the plurality of areas 1211, 1212, and 1213 included in the single video stream 901. For example, as illustrated in FIG. 12, the master device (e.g., the first client device 1100*a*) may acquire coordinate information 1221 for identifying (or defining) the respective multiple areas 1211, 1212, and 1213 according to the plurality of areas 1211, 1212, and 1213 (e.g., a first area, a second area, a third area, and a fourth area). The coordinate information 1221 for the respective areas 1211, 1212, and 1213 may include at least some coordinates among coordinates of the outline of the areas. For example, referring to FIG. 12, if a shape of one area is a rectangle, the coordinate information for identification of the area may include information on coordinates (e.g., (0,0) and (X,Y), (X,0) and (X',Y), and (0,Y) and (X,Y')) of vertices (e.g., an upper left vertex and a lower right vertex) in a diagonal direction. Without being limited to the description, the coordinate information for identification of an area may include information on a larger number of coordinates, or may include various types of positional coordinates according to the shape of the area. In addition to the coordinate information, the master device (e.g., the first client device 1100*a*) may generate various types of information for identification of the area. For example, if the shape of the area is circular (not illustrated), the information for identification of the area may include coordinates of a center point and information on a radius. In addition, in an embodiment of the disclosure, the master device (e.g., the first client device 1100*a*) may acquire the identification information 1223 of the client device 210 corresponding to the video streams arranged according to the respective areas 1211, 1212, and 1213. As illustrated in reference numeral 1102 of FIG. 11, the master device (e.g., the first client device 1100*a*) may identify port numbers 1121 used by respective slave devices from network information of other slave devices included in the group information. The master device (e.g., the first client device 1100a) may identify a designated port number associated with a video stream arranged in an area, and may identify, based on the port numbers 1121, identification information (e.g., ID) of a slave device (e.g., the second client device 1100b) corresponding to the designated port number (e.g., the slave device having transmitted a video stream and/or a media stream to the port number).

According to an embodiment of the disclosure, in operation 1011, the client device 210 may transmit the first video stream and multiple pieces of identification information to the server. For example, the master device (e.g., the first client device 1100a) may transmit 1120, to the media server 221, the plurality of pieces of identification information 903 (e.g., the area identification information 1221 according to the plurality of areas 1211, 1212, and 1213, and the device identification information 1223 according to the plurality of areas 1211, 1212, and 1213) and the encoded single video stream 901 acquired as a result in operation 1009. In this case, the master device (e.g., the first client device 1100a) may perform time synchronization between the single video stream 901, an audio stream received by the master device, and an audio stream generated by the master device, and may transmit a media stream including the time-synchronized single video stream 901 and audio stream to the media server 221. The single video stream 901 may be separated into multiple video streams according to the plurality of pieces of identification information 903 by the media server 221, and this will be described later with reference to FIGS. 15 and 16.

Hereinafter, an example of an operation of the client device 210 according to an embodiment will be described.

According to an embodiment of the disclosure, the master device (e.g., the first client device 1400a) of the group may configure an image quality associated with the group (or used by the client devices 210 in the group), based on a bandwidth with respect to the media server 221, and may generate a merged single video stream based on the configured image quality, so as to transmit the generated single video stream to the media server 221.

Figure 13:
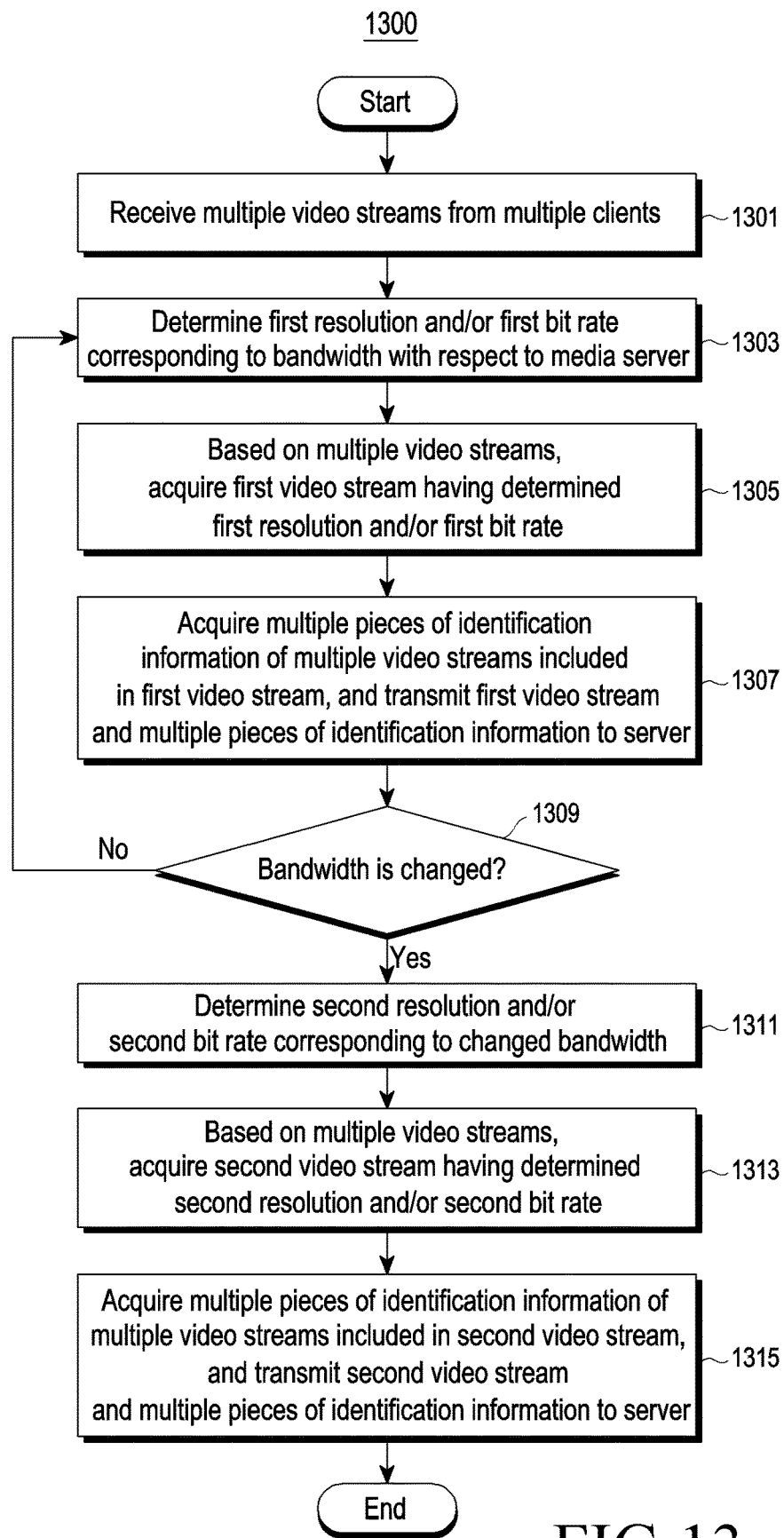
FIG. 13 is a flowchart illustrating an operation of a client device according to an embodiment of the disclosure.

FIG. 13 is a flowchart 1300 illustrating an operation of a client device according to an embodiment of the disclosure. The operations illustrated in FIG. 13 are not limited to the illustrated order and may be performed in various orders. According to an embodiment of the disclosure, more operations or at least one fewer operation than those illustrated in FIG. 13 may be performed. Hereinafter, FIG. 13 will be described with reference to FIG. 14.

Figure 14:
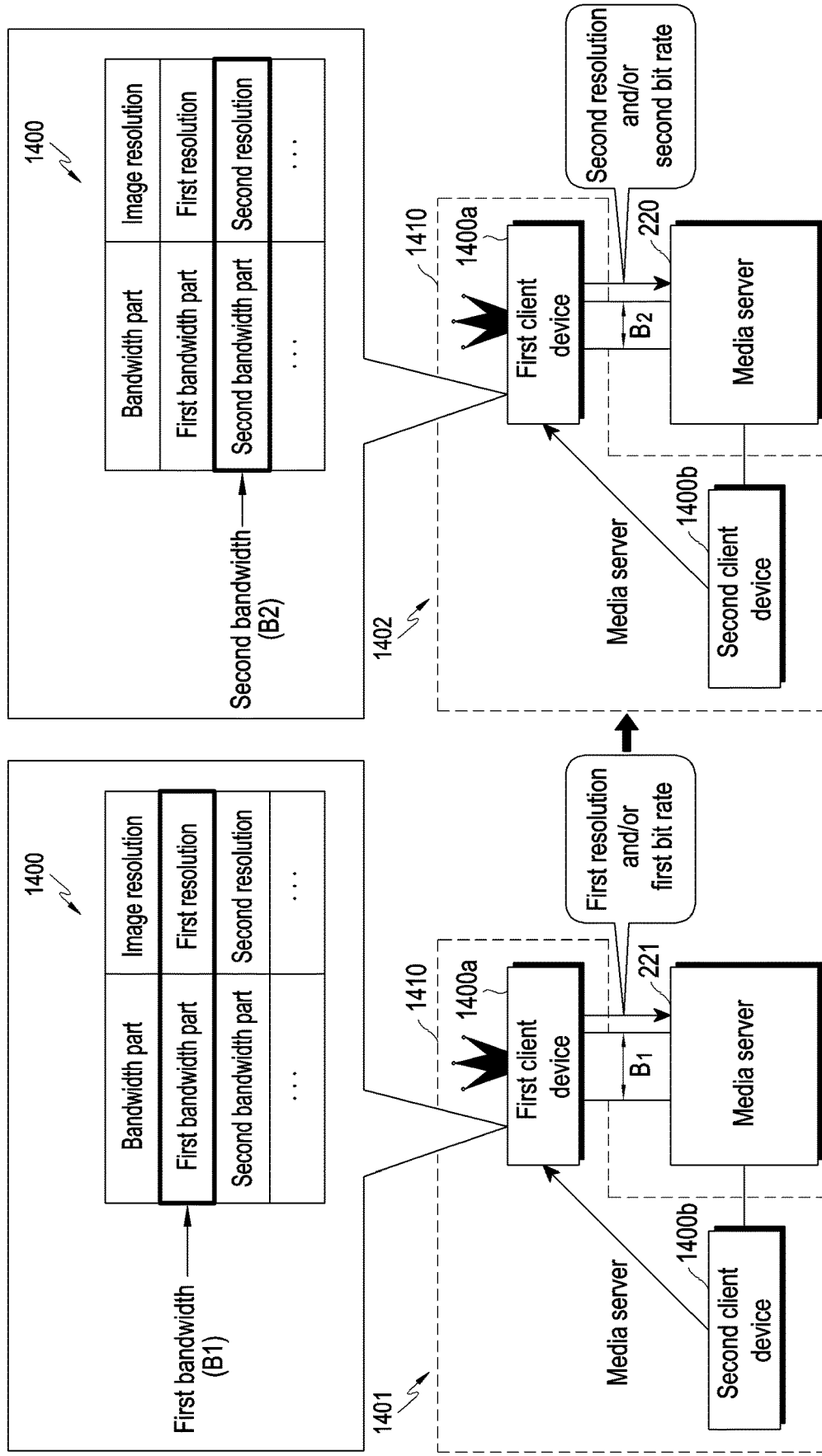
FIG. 14 illustrates a configuring an image quality associated with a group, based on a bandwidth with respect to a media server, by a master device (e.g., a first client device) of the group according to an embodiment of the disclosure.

FIG. 14 illustrates configuring an image quality associated with a group 1400, based on a bandwidth with respect to a media server, by a master device (e.g., a first client device) of a group according to an embodiment of the disclosure.

Referring to FIGS. 13 and 14, according to an embodiment of the disclosure, in operation 1301, the client device 210 (e.g., a first client device 1400a) may receive multiple video streams from multiple client devices. For example, as illustrated in reference numeral 1401 of FIG. 14, the client device 210 (e.g., a first client device 1400a) configured to be a master device of a group 1410 may receive at least one media stream from at least one client device (e.g., a second client device 1400b) configured to be a slave device of the group, and may acquire at least one video stream from at least one media stream. Receiving of multiple video streams by the master device (e.g., the first client device 1400a) from slave devices (e.g., the second client device 1400b) may be performed as described above with reference to operation 1007 of FIG. 10, and duplicate descriptions are thus omitted.

According to an embodiment of the disclosure, the client device 210 (e.g., the first client device 1400a) may determine, in operation 1303, a first resolution and/or a first bit rate corresponding to a bandwidth with respect to the media server 221, and may generate (or acquire) a first video stream having the determined first resolution and/or first bit rate, based on the plurality of video streams in operation 1305. For example, as described above, the master device (e.g., the first client device 1400a) of the group 1410 may configure an image quality (e.g., a frame rate, a resolution, and/or a bit rate) associated with the group 1410 (or used by the group 1410). In this case, the master device (e.g., the first client device 1400a) may calculate (or predict or identify) the bandwidth between the media server 221 and the master device (e.g., the first client device 1400a), and may configure a resolution a bit rate corresponding to the calculated bandwidth (e.g., a first base station B1). Prediction of the bandwidths can be implemented by an existing known art, such as an algorithm for calculating a ratio between transmitted packets and received packets (e.g., if a ratio of received packets is high, a bandwidth is calculated to be high), and detailed descriptions are thus omitted. The master device (e.g., the first client device 1400a) may transmit, to another slave device (e.g., the second client device 1400b), information on the first resolution and/or the first bit rate corresponding to the currently calculated bandwidth (e.g., the first bandwidth B1). The master device (e.g., the first client device 1400a) may receive video streams having the first resolution and/or the first bit rate from slave devices (e.g., the second client device 1400b), and the master device (e.g., the first client device 1400a) may acquire a video stream having the first resolution and/or the first bit rate, and generate a single video stream, based on the video streams having the first resolution and/or the first bit rate. Generating of the single video stream (e.g., the single video stream 901) by the master device (e.g., the first client device 1400a) is the same as the descriptions provided with reference to operations 1007 to 1009 of FIG. 10, and duplicate descriptions are thus omitted. Hereinafter, more detailed descriptions will be provided for an example of configuring a resolution and/or a bit rate, based on a bandwidth of the master device (e.g., the first client device 1400a).

According to an embodiment of the disclosure, as illustrated in reference numeral 1401 of FIG. 14, the master device (e.g., the first client device 1400a) may store information 1400 on multiple bandwidth parts and frame rates corresponding to the plurality of bandwidth parts, and may configure a frame rate and/or a bit rate associated with the group 1410, based on the stored information 1400 and the currently calculated bandwidth (e.g., the first bandwidth B1). For example, the master device (e.g., the first client device 1400a) may store the information 1400 on a first resolution (e.g., 1080p) corresponding to a first bandwidth part (e.g., a bandwidth exceeding 3 Mbps and equal to or lower than 5 Mbps) and a second resolution (e.g., 720p) corresponding to a second bandwidth part (e.g., a bandwidth exceeding 1.5 Mbps and lower than 3 Mbps). Information on a resolution corresponding to each of more or less bandwidth parts may be stored without being limited to the illustrated resolution for each bandwidth part, and a bandwidth part value and a resolution value may be configured to be various values without being limited to the illustrated bandwidth part value and resolution value. The master device (e.g., the first client device 1400a) may compare multiple bandwidth parts with the currently calculated bandwidth (e.g., the first base station B1), and as illustrated in reference numeral 1401 of FIG. 14, the master device may identify a bandwidth part (e.g., the first bandwidth part) including the calculated bandwidth, and configure a frame rate (e.g., a first frame rate) corresponding to the bandwidth part to be the frame rate associated with the group 1410. In addition, the master device (e.g., the first client device 1400a) may identify a bit rate corresponding to the currently calculated bandwidth, and configure the identified bit rate to be the bit rate associated with the group 1410. For example, the master device (e.g., the first client device 1400a) may configure the bit rate to be 4 Mbps if the currently calculated bandwidth is 4 Mbps. In addition, without being limited to the descriptions, the master device (e.g., the first client device 1400a) may identify a value lower than the bit rate corresponding to the currently calculated bandwidth (e.g., the first bandwidth B1), and may configure the bit rate associated with the group 1410 to be the identified value. For example, the master device (e.g., the first client device 1400a) may configure the bit rate associated with the group 1410 to be a value equal to a specified percentage (e.g., 60% to 70%) of the currently calculated bandwidth (e.g., the first bandwidth B1). For example, the master device (e.g., the first client device 1400a) may configure the bit rate to be 3 Mbps (5 Mbps*0.6) if the currently calculated bandwidth is 5 Mbps. In addition, for example, the master device (e.g., the first client device 1400a) may configure the bit rate associated with the group 1410 to be a value obtained by subtracting a designated value from the currently calculated bandwidth (e.g., the first bandwidth (B1)). In this case, the master device (e.g., the first client device 1400a) may identify a bandwidth part (e.g., the second bandwidth part) including the bit rate calculated to have a low value (or a value lower than the identified currently calculated bandwidth) (e.g., 2.5 Mbps), and may identify that the identified bandwidth part (e.g., the second bandwidth part) is different from the bandwidth part (e.g., the first bandwidth part) identified to correspond to the currently calculated bandwidth. In this case, the master device (e.g., the first client device 1400a) may configure the frame rate associated with the group 1410 to be the frame rate (e.g., the second frame rate) corresponding to the identified bandwidth part (e.g., the second bandwidth part), and configure the bit rate associated with the group 1410 to be the calculated bit rate (e.g., 2.5 Mbps).

According to an embodiment of the disclosure, in operation 1307, the client device 210 may acquire multiple pieces of identification information for the plurality of video streams included in the first video stream, and transmit the first video stream and the plurality of pieces of identification information to the server. For example, the master device (e.g., the first client device 1400a) (e.g., the first client device 201) may acquire information (area identification information) (e.g., the area identification information 1221) for identification of respective multiple areas included in a single video stream (e.g., the single video stream 901) and identification information (device identification information) (e.g., the device identification information 1223) of the client device 210 corresponding to each of the plurality of areas. The master device (e.g., the first client device 1400a) may transmit, to the media server 221, the single video stream and multiple pieces of identification information (e.g., area identification information for each of the areas and device identification information for each of the areas) corresponding to each of the areas. Acquiring of the plurality of pieces of identification information for the single video stream and transmitting the single video stream and the plurality of pieces of identification information to the server by the master device (e.g., the first client device 1400a) may be performed as in aforementioned operations 1009 and 1011 of FIG. 10, and duplicate descriptions are thus omitted.

According to an embodiment of the disclosure, the client device 210 may identify a change in the bandwidth in operation 1309, and if the bandwidth has changed, the client device 210 may determine, in operation 1311, the second resolution and/or second bit rate corresponding to the changed bandwidth. For example, the master device (e.g., the first client device 1400a) may calculate the bandwidth between the media server 221 and the master device (e.g., the first client device 1400a) periodically or based on occurrence of a designated event (e.g., changing of a communication connection scheme used by the master device (e.g., the first client device 1400a)). The master device (e.g., the first client device 1400a) may compare the previously calculated first bandwidth B1 with the currently calculated second bandwidth B2 so as to identify whether the bandwidth has changed. In this case, the master device (e.g., the first client device 1400a) may determine whether the bandwidth has changed, according to whether the first bandwidth B1 and the second bandwidth B2 are the same, but may also determine whether the bandwidth has changed, according to whether the second bandwidth B2 is included within a designated range (e.g., within 10%) of the first bandwidth B1 (e.g., identifying as unchanged if included in the range, and identifying as changed if not included in the range). In an embodiment of the disclosure, if it is identified that the bandwidth is not changed, the master device (e.g., the first client device 1400a) may maintain the resolution (e.g., the first resolution) and the bit rate (e.g., the first bit rate) configured in operation 1305. In addition, in an embodiment of the disclosure, if the currently calculated second bandwidth B2 is identified to be different from the previously calculated first bandwidth B1 (i.e., if the bandwidth has changed), the master device (e.g., the first client device 1400a) may identify a bandwidth part including the second bandwidth B2 and may configure a resolution and a bit rate associated with the group 1410, based on the identified bandwidth part. For example, if the currently calculated second bandwidth B2 is included in a bandwidth part (e.g., the first bandwidth part) including the previously calculated bandwidth (e.g., the first bandwidth B1), the master device (e.g., the first client device 1400a) may maintain the resolution determined in operation 1305 and may configure a bit rate corresponding to the first bandwidth B1. In addition, for example, if the second bandwidth B2 is identified not to be included in the first bandwidth part, the master device (e.g., the first client device 1400a) may identify another bandwidth part including the second bandwidth B2, may configure a resolution associated with the group 1410 to be a second resolution corresponding to the second bandwidth part, and may configure a bit rate corresponding to the second bandwidth B2. Configuring of the bit rate and the resolution according to the bandwidth between the master device (e.g., the first client device 1400a) and the media server 221 may be performed as described above with reference to operation 1305, and duplicate descriptions are thus omitted.

According to an embodiment of the disclosure, the client device 210 (e.g., the first client device 1400a) may acquire, based on multiple video streams, a second video stream having the determined second resolution and/or second bit rate in operation 1313, and may acquire multiple pieces of identification information of the plurality of video streams included in the second video stream and transmit the second video stream and the plurality of pieces of identification information to the server, in operation 1315. For example, as illustrated in reference numeral 1402 of FIG. 14, the master device (e.g., the first client device 1400a) may transmit a single second video stream (e.g., the video stream 901) having the second resolution and the second bit rate and the plurality of pieces of identification information (e.g., the identification information 903) to the media server 221. A second data transmission amount of the second video stream (the video stream transmitted to the media server 221 in reference numeral 1402 of FIG. 14) may be different from a first data transmission amount of the first video stream (the video stream transmitted to the media server 221 in reference numeral 1401 of FIG. 14) (e.g., the second data transmission amount is less than the first data transmission amount).

Hereinafter, an example of an operation of the media server 221 according to an embodiment will be described.

According to an embodiment of the disclosure, the media server 221 may acquire multiple video streams, based on the plurality of pieces of identification information from the single video stream, and may transmit some of the plurality of video streams to at least some of multiple clients participating in the conference room.

Figure 15:
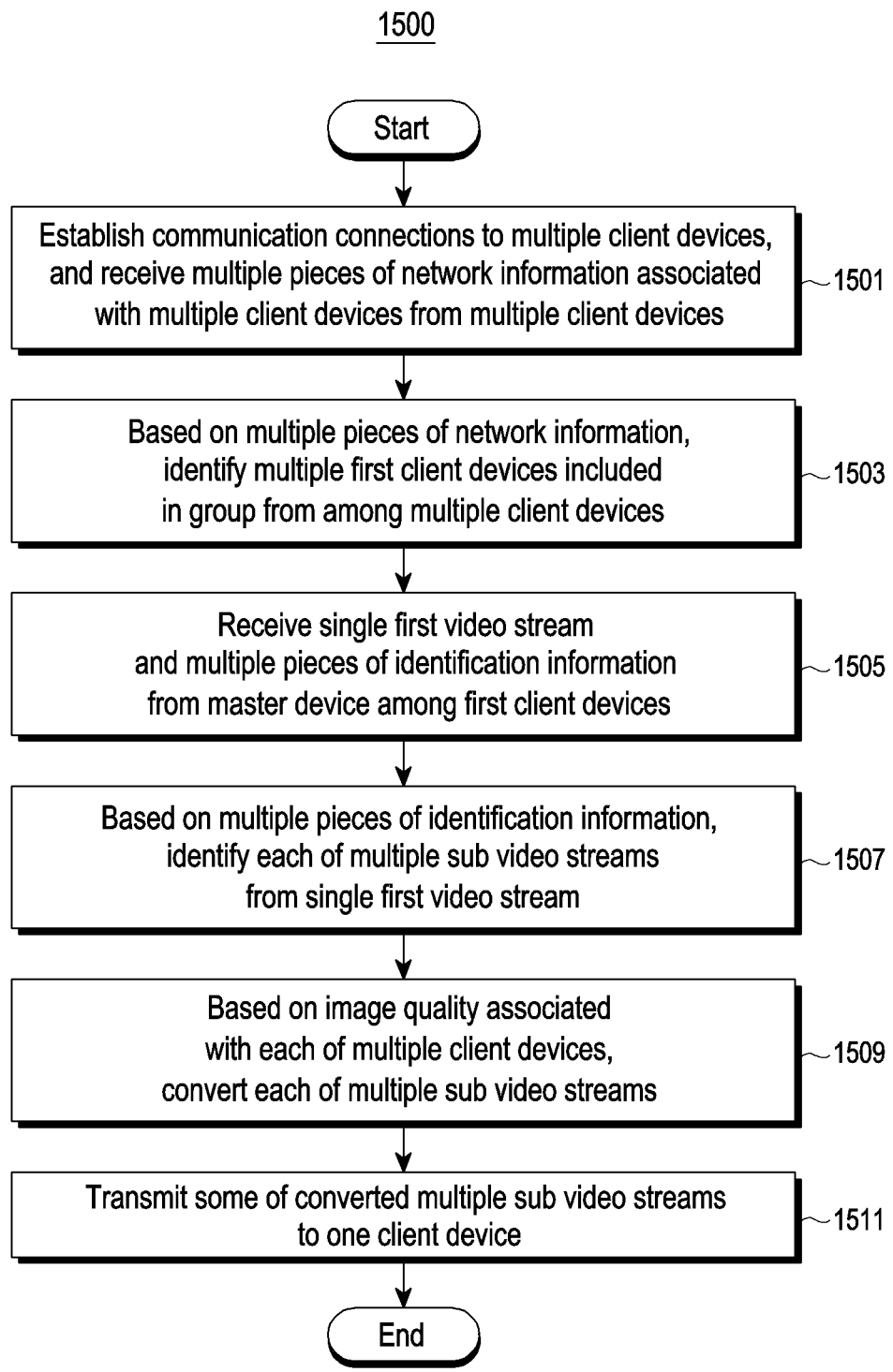
FIG. 15 is a flowchart illustrating an operation of a media server according to an embodiment of the disclosure.

FIG. 15 is a flowchart 1500 illustrating an operation of a media server according to an embodiment of the disclosure. The operations illustrated in FIG. 15 are not limited to the illustrated order and may be performed in various orders. According to an embodiment of the disclosure, more operations or at least one fewer operation than those illustrated in FIG. 15 may be performed. Hereinafter, FIG. 15 will be described with reference to FIG. 16.

Figure 16:
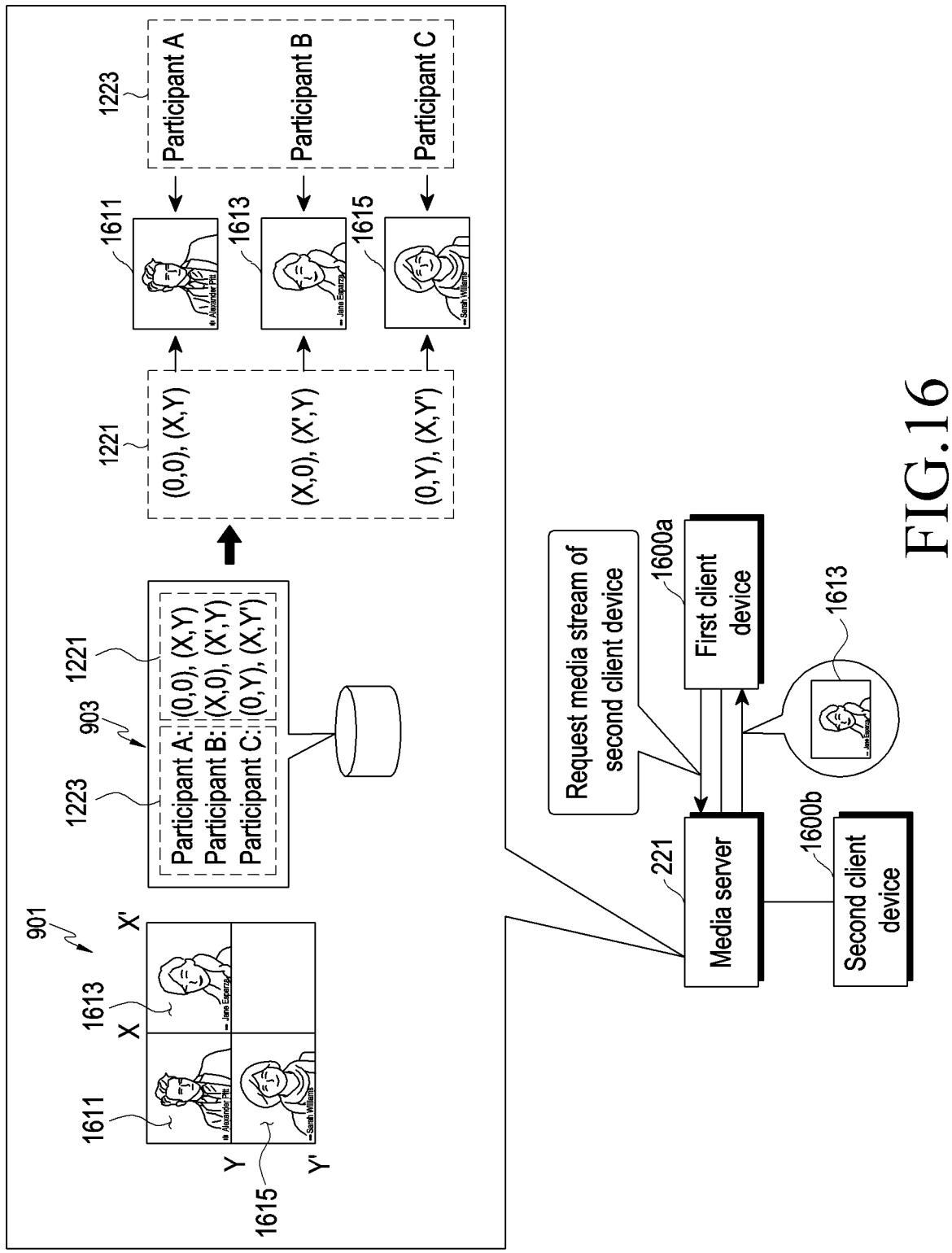
FIG. 16 is a diagram illustrating identifying multiple video streams from a single video stream, based on multiple pieces of identification information by a media server according to an embodiment of the disclosure.

FIG. 16 is a diagram illustrating identifying multiple video streams from a single video stream, based on multiple pieces of identification information by a media server according to an embodiment of the disclosure.

Referring to FIGS. 15 and 16, according to an embodiment of the disclosure, in operation 1501, the media server 221 may establish communication connections to multiple client devices 210, and may receive multiple pieces of network information associated with the plurality of client devices 210 from the plurality of client devices 210. For example, multiple client devices (e.g., a first client device 1600a and a second client device 1600b) connected to a designated conference room may request a communication connection to the media server 221, based on information for establishment of a communication connection to the media server 221, which is received from the management server 222. The media server 221 may establish communication connections to the plurality of client devices 210 in response to the communication connection request. The media server 221 may receive, from the plurality of client devices (e.g., the first client device 1600a and the second client device 1600b) to which the communication connection has been established, network information (e.g., ICE candidate information and/or port numbers) of the respective multiple client devices 210. Operations of the media server 221 may be performed in the same manner as aforementioned operations 701 to 707 of FIG. 7, and duplicate descriptions are thus omitted.

According to an embodiment of the disclosure, in operation 1503, the media server 221 may identify multiple first client devices 210 included in a group from among the plurality of client devices 210, based on the plurality of pieces of network information. For example, the media server 221 may identify multiple candidate client devices 210 to be classified into a group (or to be included in a group), based on at least some (e.g., public IP address) of the respective multiple pieces of network information. The media server 221 may transmit a connection code and network information of a different candidate client device 210 to each of the plurality of candidate client devices 210, so as to enable the plurality of candidate client devices 210 to perform a connectivity check operation. The media server 221 may generate a group, based on codes received from the plurality of candidate client devices 210 according to the connectivity check operation, and may identify multiple client devices 210 included in the generated group. Operation 1503 of the media server 221 may be performed in the same manner as aforementioned operations 709 to 715 of FIG. 7, and duplicate descriptions are thus omitted.

According to an embodiment of the disclosure, in operation 1505, the media server 221 may receive a single first video stream and multiple pieces of identification information from a master device among the first client devices 210. The media server 221 may identify a master device (e.g., the first client device 1600a) and slave devices (e.g., the second client device 1600b), based on information (e.g., device type information) associated with processing capabilities of multiple client devices of the first client device 1600a and the second client device 1600b among multiple clients included in the group. The media server 221 may transmit group information to the identified master device (e.g., the first client device 1600a) and slave devices (e.g., the second client device 1600b). As illustrated in FIG. 16, the media server 221 may receive, based on transmission of the group information, the single first video stream 901 and multiple pieces of identification information 903 (e.g., the area identification information 1221 for each of multiple areas, and device identification information 1223 for each of multiple areas) from the master device of the group.

According to an embodiment of the disclosure, in operation 1507, the media server 221 may identify each of multiple sub video streams from the single first video stream, based on the plurality of pieces of identification information. The media server 221 may decode the merged video stream by using a decoder, and may identify multiple sub video streams 1611, 1613, and 1615 included in the decoded video stream 901, based on the plurality of pieces of identification information (e.g., area identification information for each of multiple areas and device identification information for each of multiple areas). For example, as illustrated in FIG. 16, the media server 221 may identify, from the merged video stream 901, a first area corresponding to area identification information (e.g., coordinate information ((0,0), (X,Y))) for identification of the first area, and may acquire (or separate (e.g., crop)) a first sub video stream 1611 from the first area. The media server 221 may configure time information of the acquired first sub video stream 1611 to correspond to time information of the merged video stream 901. The media server 221 may identify first device identification information (participant A) for the identified first area, and may identify that the acquired first sub video stream 1611 is acquired and/or generated by the first client device 210 corresponding to the first device identification information. The media server 221 may perform, also for other areas (e.g., a second area and a third area), acquisition of the sub video streams 1613 and 1615 and identification of the client device 210 corresponding to the acquired sub video streams 1613 and 1615, as described above.

According to an embodiment of the disclosure, in operation 1509, the media server 221 may convert each of the plurality of sub video streams, based on an image quality associated with each of the plurality of client devices 210. For example, the media server 221 may identify an image quality (e.g., a resolution, a frame rate, and/or a bit rate) associated with each of the plurality of client devices 210 (or used by or available for each of the plurality of client devices 210), based on information received from each of the plurality of client devices 210. In an embodiment of the disclosure, the media server 221 may receive, before generation of the group (e.g., FIG. 5), a media stream from each of the plurality of client devices 210 to which communication connections have been established. The media server 221 may identify an image quality of a video stream included in the received media stream, and may identify the identified image quality as an image quality associated with the client device 210 which has transmitted the video stream. In other words, the image quality associated with each of the plurality of client devices 210 may be an image quality of a video stream transmitted to the media server 221 by each of the client devices 210 before generation of the group, as described above. In addition, in an embodiment of the disclosure, the media server 221 may request information on the image qualify associated with the plurality of client devices 210 (or used by or available for each of the plurality of client devices 210) from the plurality of client devices 210, and may receive information on the image quality. The media server 221 may store the identified and/or received information on the image quality associated with the plurality of client devices 210. When sub video streams (e.g., the first to third sub video streams) are acquired from the merged video stream, the media server 221 may convert, based on the stored information, the image quality of the sub video streams into the image quality associated with (or used by or available for) the client devices 210 (e.g., the first to the third client devices 210) corresponding to the sub video streams. In addition, the media server 221 may encode the sub video streams having the converted image quality, after conversion of the image quality.

According to an embodiment of the disclosure, in operation 1511, the media server 221 may transmit some of the converted multiple sub video streams to one client device 210. For example, when the media server 221 receives, from one client device (e.g., the first client device 1600a), a request for a media stream for another client device (e.g., the second client device 1600b), the media server 221 may identify the video stream 1613 corresponding to the another client device (e.g., the second client device 1600b) and may transmit the identified video stream 1613 to the one client device 210. For example, the media server 221 may identify, based on the device identification information, the second area corresponding to the another client device (e.g., the second client device 1600b), for which the request has been made, and may identify and transmit the second video stream 1613 acquired from the second area among multiple video streams 1611, 1613, and 1615. Operation 1511 of the media server 221 may be performed in the same manner as aforementioned operations 731 and 733 of FIG. 7, and duplicate descriptions are thus omitted.

According to an embodiment of the disclosure, a server (e.g., the media server 221 of FIG. 2A) may be provided, the server (e.g., the media server 221 of FIG. 2A) including a communication circuit (e.g., the communication circuit 460 of FIG. 4), and at least one processor (e.g., the processor 450 of FIG. 4), wherein the at least one processor (e.g., the processor 450 of FIG. 4) is configured to establish, using the communication circuit (e.g., the communication circuit 460 of FIG. 4), communication connections to a plurality of client devices participating in a conference room, receive, from the plurality of client devices, multiple pieces of network information associated with the plurality of client devices by using the communication circuit (e.g., the communication circuit 460 of FIG. 4), identify, based on the plurality of pieces of network information, multiple first client devices to be included in a group from among the plurality of client devices, receive, using the communication circuit (e.g., the communication circuit 460 of FIG. 4), a first video stream including multiple video streams associated with the plurality of client devices and multiple pieces of identification information for identification of the plurality of video streams, from a master device among the identified multiple first client devices—the plurality of pieces of identification information correspond to the plurality of video streams, respectively—, identify the plurality of video streams included in the received first video stream, based on the plurality of pieces of identification information, and transmit at least some of the plurality of video streams to at least some of the plurality of first client devices by using the communication circuit (e.g., the communication circuit 460 of FIG. 4).

According to an embodiment of the disclosure, the server (e.g., the media server 221 of FIG. 2A) may be provided, wherein the first video stream includes a plurality of areas and the plurality of video streams arranged in the plurality of areas, and the at least one processor (e.g., the processor 450 of FIG. 4) is configured to, based on the plurality of pieces of identification information, identify the plurality of areas included in the first video stream, and acquire the plurality of video streams from the identified plurality of areas, respectively.

According to an embodiment of the disclosure, the server (e.g., the media server 221 of FIG. 2A) may be provided, wherein each of the plurality of pieces of identification information includes coordinate information for identification of a respective one of the plurality of areas, and first identification information of a client device corresponding to a respective one of the plurality of areas, and the at least one processor (e.g., the processor 450 of FIG. 4) is configured to, based on the first identification information, identify a client device corresponding to a respective one of multiple video streams acquired from a respective one of the plurality of areas from among the plurality of first client devices.

According to an embodiment of the disclosure, the server (e.g., the media server 221 of FIG. 2A) may be provided, wherein the at least one processor (e.g., the processor 450 of FIG. 4) is configured to identify information on image qualities associated with the plurality of first client devices, the information on the image qualities including at least one of a resolution, a frame rate, or a bit rate, and convert first image qualities of the acquired plurality of video streams into the image qualities associated with the plurality of first client devices identified to correspond to each of the plurality of video streams, based on the first identification information.

According to an embodiment of the disclosure, the server (e.g., the media server 221 of FIG. 2A) may be provided, wherein the at least one processor (e.g., the processor 450 of FIG. 4) is configured to receive an audio stream from the master device, perform time synchronization between the audio stream and the plurality of video streams having the converted image qualities, and transmit a media stream including at least some of the plurality of video streams and the audio stream, which are time-synchronized, to at least some of the plurality of client devices.

According to an embodiment of the disclosure, the server (e.g., the media server 221 of FIG. 2A) may be provided, wherein the at least one processor (e.g., the processor 450 of FIG. 4) is configured to receive information indicating that a second client device among the plurality of first client devices requests a video stream of a third client device, identify an area corresponding to the third client device based on the first identification information in response to the received information, identify a second video stream corresponding to the identified area from among the plurality of video streams having the converted image qualities, and transmit the identified second video stream to the second client device.

According to an embodiment of the disclosure, the server (e.g., the media server 221 of FIG. 2A) may be provided, wherein the plurality of pieces of network information include information on IP addresses of the plurality of client devices and information on port numbers used by the plurality of client devices, and the at least one processor (e.g., the processor 450 of FIG. 4) is configured to compare information on the IP addresses of the plurality of client devices so as to identify multiple candidate client devices to be included in the group from among the plurality of client devices, the plurality of candidate client devices including a first client device and a second client device, transmit first group candidate information to the first client device, the first group candidate information including network information of the second client device, a request code to be transmitted to the second client device, and a response code to be transmitted to the second client device, and transmit second group candidate information to the second client device, the second group candidate information including network information of the first client device, a request code to be transmitted to the first client device, and a response code to be transmitted to the first client device.

According to an embodiment of the disclosure, the server (e.g., the media server 221 of FIG. 2A) may be provided, wherein the processor is configured to receive a first code from the first client device based on transmitting the first group candidate information, receive a second code from the second client device based on transmitting the second group candidate information, and generate the group including the first client device and the second client device based on the first code and the second code.

According to an embodiment of the disclosure, the server (e.g., the media server 221 of FIG. 2A) may be provided, wherein the at least one processor (e.g., the processor 450 of FIG. 4) is configured to configure the master device and a slave device of the group, based on information associated with processing capabilities of the plurality of first client devices included in the group, the information associated with the processing capabilities including at least one of device type information, bandwidth information, or cost information.

According to an embodiment of the disclosure, the server (e.g., the media server 221 of FIG. 2A) may be provided, wherein the at least one processor (e.g., the processor 450 of FIG. 4) is configured to, based on occurrence of a designated event, initiate identification of multiple candidate client devices to be included in the group, the occurrence of the designated event including identification that the number of client devices participating in the conference room corresponds to a designated number, or a designated time being elapsed after generation of the conference room.

According to an embodiment of the disclosure, an electronic device (e.g., the first client device 800a of FIG. 7) may be provided, the electronic device (e.g., the first client device 800a of FIG. 7) including a communication circuit (e.g., the communication circuit 420 of FIG. 4) and at least one processor (e.g., the processor 410 of FIG. 4), wherein the at least one processor (e.g., the processor 410 of FIG. 4) is configured to establish a communication connection to a media server (e.g., the media server 221 of FIG. 2A) associated with a conference room by using the communication circuit (e.g., the communication circuit 420 of FIG. 4)—the conference room is associated with a plurality of external electronic devices (e.g., the second client device 800b of FIG. 7)—, transmit network information associated with the electronic device (e.g., the first client device 800a of FIG. 7) to the media server (e.g., the media server 221 of FIG. 2A) by using the communication circuit (e.g., the communication circuit 420 of FIG. 4), receive a plurality of pieces of first network information associated with the plurality of external electronic devices (e.g., the second client device 800b of FIG. 7) from the media server (e.g., the media server 221 of FIG. 2A), based on transmitting the network information, by using the communication circuit (e.g., the communication circuit 420 of FIG. 4), receive a plurality of video streams associated with the plurality of external electronic devices (e.g., the second client device 800b of FIG. 7) from the plurality of external electronic devices (e.g., the second client device 800b of FIG. 7), based on the plurality of pieces of first network information, by using the communication circuit (e.g., the communication circuit 420 of FIG. 4), acquire a first video stream including the plurality of video streams, acquire a plurality of pieces of identification information for identification of the plurality of video streams included in the first video stream, and transmit the first video stream and the plurality of pieces of identification information to the media server (e.g., the media server 221 of FIG. 2A).

According to an embodiment of the disclosure, the electronic device (e.g., the first client device 800a of FIG. 7) may be provided, wherein the electronic device (e.g., the first client device 800a of FIG. 7) and the plurality of external electronic devices (e.g., the second client device 800b of FIG. 7) are configured to be included in a group, the electronic device (e.g., the first client device 800a of FIG. 7) is configured to be a master device of the group, the plurality of external electronic devices are configured to be slave devices of the group, and the at least one processor (e.g., the processor 410 of FIG. 4) is configured to receive the plurality of video streams from the plurality of external electronic devices (e.g., the second client device 800b of FIG. 7), based on the electronic device (e.g., the first client device 800a of FIG. 7) being configured to be the master device.

According to an embodiment of the disclosure, the electronic device (e.g., the first client device 800a of FIG. 7) may be provided, wherein the plurality of pieces of identification information include coordinate information for identification of respective a plurality of areas, and the at least one processor (e.g., the processor 410 of FIG. 4) is configured to, by arranging the plurality of video streams in the plurality of areas, respectively, generate the first video stream including the plurality of video streams in the plurality of areas, and acquire the coordinate information for identification of the respective plurality of areas.

According to an embodiment of the disclosure, the electronic device (e.g., the first client device 800a of FIG. 7) may be provided, wherein the plurality of pieces of identification information further include identification information of external electronic devices (e.g., the second client device 800b of FIG. 7) corresponding to the respective plurality of areas, and the at least one processor (e.g., the processor 410 of FIG. 4) is configured to receive group information from the media server (e.g., the media server 221 of FIG. 2A), the group information including identification information of the group and network information of each of the plurality of external electronic devices (e.g., the second client device 800b of FIG. 7), and the network information including IP address information and port number information of each of the plurality of external electronic devices (e.g., the second client device 800b of FIG. 7), identify, based on the network information, first identification information of the external electronic devices (e.g., the second client device 800b of FIG. 7) corresponding to the received multiple video streams, respectively, and based on identifying the first identification information of the external electronic devices (e.g., the second client device 800b of FIG. 7) corresponding to the received plurality of video streams, respectively, acquire the identification information of the external electronic devices (e.g., the second client device 800b of FIG. 7) corresponding to the plurality of areas in which the received plurality of video streams are arranged, respectively.

According to an embodiment of the disclosure, the electronic device (e.g., the first client device 800a of FIG. 7) may be provided, wherein at least one processor (e.g., the processor 410 of FIG. 4) is configured to predict a bandwidth with respect to the media server (e.g., the media server 221 of FIG. 2A), configure, based on the predicted bandwidth, an image quality associated with the group, the image quality associated with the group including a resolution associated with the group and a bit rate associated with the group, transmit information on the configured image quality to the plurality of external electronic devices (e.g., the second client device 800b of FIG. 7), and based on transmitting the information on the image quality, receive the plurality of video streams having the image quality from the plurality of external electronic devices (e.g., the second client device 800b of FIG. 7).

According to an embodiment of the disclosure, the electronic device (e.g., the first client device 800a of FIG. 7) may be provided, wherein the at least one processor (e.g., the processor 410 of FIG. 4) is configured to store information on a resolution for each of a plurality of bandwidth parts, identify a first bandwidth part including the predicted bandwidth from among the plurality of bandwidth parts, configure a first resolution corresponding to the first bandwidth part to be the resolution associated with the group, and configure the bit rate associated with the group, based on the first bandwidth.

According to an embodiment of the disclosure, the electronic device (e.g., the first client device 800a of FIG. 7) may be provided, wherein the plurality of external electronic devices (e.g., the second client device 800b of FIG. 7) include a second client device, and the at least one processor (e.g., the processor 410 of FIG. 4) is configured to, based on transmitting the network information, receive group candidate information from the media server (e.g., the media server 221 of FIG. 2A), the group candidate information including network information of the second client device, a request code to be transmitted to the second client device, and a response code to be transmitted to the second client device, transmit the request code to the second client device based on the network information of the second client device, and receive a first response code based on transmitting the request code.

According to an embodiment of the disclosure, the electronic device (e.g., the first client device 800a of FIG. 7) may be provided, wherein the at least one processor (e.g., the processor 410 of FIG. 4) is configured to transmit the first response code to the media server (e.g., the media server 221 of FIG. 2A), and receive the group information based on transmitting the first response code.

According to an embodiment of the disclosure, a method of a server (e.g., the media server 221 of FIG. 2A) may be provided, the method including establishing, using a communication circuit, communication connections to a plurality of client devices participating in a conference room, receiving, from the plurality of client devices, a plurality of pieces of network information associated with the plurality of client devices by using the communication circuit, identifying, based on the plurality of pieces of network information, a plurality of first client devices to be included in a group from among the plurality of client devices, receiving, using the communication circuit, a first video stream including a plurality of video streams associated with the plurality of client devices and a plurality of pieces of identification information for identification of the plurality of video streams, from a master device among the identified plurality of first client devices—the plurality of pieces of identification information correspond to the plurality of video streams, respectively—, identifying the plurality of video streams included in the received first video stream, based on the plurality of pieces of identification information, and transmitting at least some of the plurality of video streams to at least some of the plurality of first client devices by using the communication circuit.

According to an embodiment of the disclosure, a method of an electronic device may be provided, the method including establishing, using a communication circuit, a communication connection to a media server (e.g., the media server 221 of FIG. 2A) associated with a conference room—the conference room is associated with a plurality of external electronic devices—, transmitting network information associated with the electronic device to the media server (e.g., the media server 221 of FIG. 2A) by using the communication circuit, receiving, using the communication circuit, a plurality of pieces of first network information associated with the plurality of external electronic devices from the media server (e.g., the media server 221 of FIG. 2A), based on transmitting the network information, receiving, using the communication circuit from the plurality of external electronic devices, a plurality of video streams associated with the plurality of external electronic devices, based on the plurality of pieces of first network information, acquiring a first video stream including the plurality of video streams, acquiring a plurality of pieces of identification information for identification of the plurality of video streams included in the first video stream, and transmitting the first video stream and the plurality of pieces of identification information to the media server (e.g., the media server 221 of FIG. 2A).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
a communication circuit;
a processor; and
a memory storing instructions that, when executed by the processor, cause the server to:
establish, using the communication circuit, communication connections to a plurality of client devices participating in a conference room,

49 receive, using the communication circuit, a plurality of pieces of network information associated with the plurality of client devices from the plurality of client devices, based on the plurality of pieces of network information, identify a plurality of first client devices to be included in a group from among the plurality of client devices, receive, using the communication circuit, a first video stream comprising:
  a plurality of video streams associated with the plurality of client devices, and
  a plurality of pieces of identification information for identification of the plurality of video streams, from a master device among the identified plurality of first client devices, —wherein the plurality of pieces of identification information correspond to the plurality of video streams, respectively, based on the plurality of pieces of identification information, identify the plurality of video streams included in the received first video stream, and transmit, using the communication circuit, at least some of the plurality of video streams to at least some of the plurality of first client devices.

2. The server of claim 1,
wherein the first video stream comprises a plurality of areas and the plurality of video streams arranged in the plurality of areas, and
wherein the memory storing instructions that, when executed by the processor, cause the server to:
  based on the plurality of pieces of identification information, identify the plurality of areas included in the first video stream, and
  acquire the plurality of video streams from the identified plurality of areas, respectively.

3. The server of claim 2,
wherein each of the plurality of pieces of identification information comprises:
  coordinate information for identification of a respective one of the plurality of areas; and
  first identification information of a client device corresponding to a respective one of the plurality of areas, and
wherein the memory storing instructions that, when executed by the processor, cause the server to:
  based on the first identification information, identify a client device corresponding to each of a plurality of video streams acquired from a respective one of the plurality of areas from among the plurality of first client devices.

4. The server of claim 3,
wherein the memory storing instructions that, when executed by the processor, cause the server to:
  identify information on image qualities associated with the plurality of first client devices, wherein the information on the image qualities comprises at least one of a resolution, a frame rate, or a bit rate, and
  convert first image qualities of the acquired plurality of video streams into the image qualities associated with the plurality of first client devices identified to correspond to the plurality of video streams, based on the first identification information.

5. The server of claim 4, wherein the memory storing instructions that, when executed by the processor, cause the server to:

50 receive an audio stream from the master device,
perform time synchronization between the audio stream and the plurality of video streams having the converted image qualities, and
transmit a media stream comprising at least some of the plurality of video streams and the audio stream, which are time-synchronized, to at least some of the plurality of client devices.

6. The server of claim 4, wherein the memory storing instructions that, when executed by the processor, cause the server to:
  receive information indicating that a second client device among the plurality of first client devices requests a video stream of a third client device,
  in response to the received information, identify an area corresponding to the third client device, based on the first identification information,
  identify a second video stream corresponding to the identified area from among the plurality of video streams having the converted image qualities, and
  transmit the identified second video stream to the second client device.

7. The server of claim 1,
wherein the plurality of pieces of network information comprise:
  information on IP addresses of the plurality of client devices; and
  information on port numbers used by the plurality of client devices, and
wherein the memory storing instructions that, when executed by the processor, cause the server to:
  compare information on the IP addresses of the plurality of client devices to identify a plurality of candidate client devices to be included in the group from among the plurality of client devices, wherein the plurality of candidate client devices comprise a first client device and a second client device,
  transmit first group candidate information to the first client device, wherein the first group candidate information comprises network information of the second client device, a request code to be transmitted to the second client device, and a response code to be transmitted to the second client device, and
  transmit second group candidate information to the second client device, wherein the second group candidate information comprises network information of the first client device, a request code to be transmitted to the first client device, and a response code to be transmitted to the first client device.

8. The server of claim 7, wherein the memory storing instructions that, when executed by the processor, cause the server to:
  based on transmitting the first group candidate information, receive a first code from the first client device,
  based on transmitting the second group candidate information, receive a second code from the second client device, and
  based on the first code and the second code, generate the group comprising the first client device and the second client device.

9. The server of claim 8, wherein the memory storing instructions that, when executed by the processor, cause the server to:
  based on information associated with processing capabilities of the plurality of first client devices included in the group, configure the master device and a slave device of the group, wherein the information associated with the processing capabilities comprises at least one of device type information, bandwidth information, or cost information.

10. The server of claim 7,
wherein the memory storing instructions that, when executed by the processor, cause the server to:
based on occurrence of a designated event, initiate identification of a plurality of candidate client devices to be included in the group, and
wherein the occurrence of the designated event comprises identifying that the number of client devices participating in the conference room corresponds to a designated number, or a designated time being elapsed after generation of the conference room.

11. An electronic device comprising:
a communication circuit;
a processor; and
a memory storing instructions that, when executed by the processor, cause the electronic device to:
establish, using the communication circuit, a communication connection to a media server associated with a conference room—the conference room is associated with a plurality of external electronic devices,
transmit, using the communication circuit, network information associated with the electronic device to the media server,
receive, using the communication circuit, a plurality of pieces of first network information associated with the plurality of external electronic devices from the media server, based on transmitting the network information,
receive, using the communication circuit, a plurality of video streams associated with the plurality of external electronic devices from the plurality of external electronic devices, based on the plurality of pieces of first network information,
acquire a first video stream comprising the plurality of video streams, and acquire a plurality of pieces of identification information for identification of the plurality of video streams included in the first video stream, and
transmit the first video stream and the plurality of pieces of identification information to the media server.

12. The electronic device of claim 11,
wherein the electronic device and the plurality of external electronic devices are configured to be included in a group,
wherein the electronic device is configured to be a master device of the group,
wherein the plurality of external electronic devices are configured to be slave devices of the group, and
wherein the memory storing instructions that, when executed by the processor, cause the server to:
based on the electronic device being configured to be the master device, receive the plurality of video streams from the plurality of external electronic devices.

13. The electronic device of claim 11,
wherein the plurality of pieces of identification information comprise coordinate information for identification of respective a plurality of areas, and
wherein the memory storing instructions that, when executed by the processor, cause the server to:
by arranging the plurality of video streams in the plurality of areas, respectively, generate the first video stream comprising the plurality of video streams in the plurality of areas, and
acquire the coordinate information for identification of the respective plurality of areas.

14. The electronic device of claim 11,
wherein the plurality of pieces of identification information further comprise identification information of external electronic devices corresponding to the respective plurality of areas, and
wherein the memory storing instructions that, when executed by the processor, cause the server to:
receive group information from the media server, wherein the group information comprises identification information of the group and network information of each of the plurality of external electronic devices, and the network information comprises IP address information and port number information of each of the plurality of external electronic devices,
based on the network information, identify first identification information of the external electronic devices corresponding to the received plurality of video streams, respectively, and
based on identifying the first identification information of the external electronic devices corresponding to the received plurality of video streams, respectively, acquire the identification information of the external electronic devices corresponding to the plurality of areas in which the received plurality of video streams are arranged, respectively.

15. The electronic device of claim 14, wherein the memory storing instructions that, when executed by the processor, cause the server to:
transmit the first response code to the media server, and
receive the group information, based on transmitting the first response code.

16. The electronic device of claim 11, wherein the memory storing instructions that, when executed by the processor, cause the server to:
predict a bandwidth with respect to the media server,
configure, based on the predicted bandwidth, an image quality associated with the group, wherein the image quality associated with the group comprises a resolution associated with the group and a bit rate associated with the group,
transmit information on the configured image quality to the plurality of external electronic devices, and
based on transmitting the information on the image quality, receive the plurality of video streams having the image quality from the plurality of external electronic devices.

17. The electronic device of claim 16, wherein the memory storing instructions that, when executed by the processor, cause the server to:
store information on a resolution for each of a plurality of bandwidth parts,
identify a first bandwidth part comprising the predicted bandwidth from among the plurality of bandwidth parts,
configure a first resolution corresponding to the first bandwidth part to be the resolution associated with the group, and
configure the bit rate associated with the group, based on the first bandwidth.

18. The electronic device of claim 11,
wherein the plurality of external electronic devices comprise a second client device, and wherein the memory storing instructions that, when executed by the processor, cause the server to:
based on transmitting the network information, receive group candidate information from the media server, wherein the group candidate information comprises network information of the second client device, a request code to be transmitted to the second client device, and a response code to be transmitted to the second client device,
transmit the request code to the second client device, based on the network information of the second client device, and
receive a first response code from the second client device, based on transmitting the request code.

19. A method of a server, the method comprising:
establishing, using a communication circuit, communication connections to a plurality of client devices participating in a conference room;
receiving, using the communication circuit, a plurality of pieces of network information associated with the plurality of client devices from the plurality of client devices;
based on the plurality of pieces of network information, identifying a plurality of first client devices to be included in a group from among the plurality of client devices;
receiving, using the communication circuit, a first video stream comprising:
a plurality of video streams associated with the plurality of client devices; and
a plurality of pieces of identification information for identification of the plurality of video streams, from a master device among the identified plurality of first client devices, wherein the plurality of pieces of identification information correspond to the plurality of video streams, respectively,
based on the plurality of pieces of identification information, identifying the plurality of video streams included in the received first video stream; and
transmitting, using the communication circuit, at least some of the plurality of video streams to at least some of the plurality of first client devices.

20. A method of an electronic device, the method comprising:
establishing, using a communication circuit, a communication connection to a media server associated with a conference room—the conference room is associated with a plurality of external electronic devices;
transmitting, using the communication circuit, network information associated with the electronic device to the media server;
receiving, using the communication circuit, a plurality of pieces of first network information associated with the plurality of external electronic devices from the media server, based on transmitting the network information;
receiving, using the communication circuit, a plurality of video streams associated with the plurality of external electronic devices from the plurality of external electronic devices, based on the plurality of pieces of first network information;
acquiring a first video stream comprising the plurality of video streams, and acquiring a plurality of pieces of identification information for identification of the plurality of video streams included in the first video stream; and
transmitting the first video stream and the plurality of pieces of identification information to the media server.

* * * * *